US012039917B2

(12) United States Patent
Bower et al.

(10) Patent No.: US 12,039,917 B2
(45) Date of Patent: Jul. 16, 2024

(54) DISPLAYS WITH HYBRID-CONTROL PIXEL CLUSTERS

(71) Applicant: X Display Company Technology Limited, Dublin (IE)

(72) Inventors: Christopher Andrew Bower, Raleigh, NC (US); Matthew Alexander Meitl, Durham, NC (US); Imre Knausz, Fairport, NY (US); Murat Ozbas, Penfield, NY (US); Ronald S. Cok, Rochester, NY (US); Mike C. Chiu, Cary, NC (US)

(73) Assignee: X Display Company Technology Limited, Dublin (IE)

( * ) Notice: Subject to any disclaimer, the term of this patent is extended or adjusted under 35 U.S.C. 154(b) by 0 days.

(21) Appl. No.: 18/061,172

(22) Filed: Dec. 2, 2022

(65) Prior Publication Data

US 2024/0185767 A1 Jun. 6, 2024

(51) Int. Cl.
*G09G 3/32* (2016.01)
*G09G 3/34* (2006.01)

(52) U.S. Cl.
CPC ............. *G09G 3/32* (2013.01); *G09G 3/3426* (2013.01); *G09G 2300/06* (2013.01); *G09G 2320/0247* (2013.01); *G09G 2320/0252* (2013.01); *G09G 2320/0686* (2013.01); *G09G 2330/021* (2013.01)

(58) Field of Classification Search
CPC ..... G09G 3/32; G09G 3/3426; G09G 2300/06
See application file for complete search history.

(56) References Cited

U.S. PATENT DOCUMENTS 5,550,066 A 8/1996 Tang et al.
7,622,367 B1 11/2009 Nuzzo et al.
8,506,867 B2 8/2013 Menard
8,722,458 B2 5/2014 Rogers et al.
9,520,537 B2 12/2016 Bower et al.
9,905,167 B2 * 2/2018 Jeon ..................... H05K 999/99
9,930,277 B2 3/2018 Cok
10,127,863 B2 * 11/2018 Jeon ..................... G09G 5/008
11,495,167 B2 * 11/2022 Yun ..................... G09G 3/3233
11,568,796 B1 * 1/2023 Ozbas ..................... G09G 3/3426
2006/0164380 A1 * 7/2006 Yang ..................... G09G 3/3677 345/103
2011/0261095 A1 * 10/2011 Missbach ............. G09G 3/2085 345/698
2016/0093600 A1 3/2016 Bower et al.
(Continued)

*Primary Examiner* — Gene W Lee
(74) *Attorney, Agent, or Firm* — Choate, Hall & Stewart LLP; Michael D. Schmitt

(57) ABSTRACT

A display includes pixels distributed in a pixel array of rows and columns that are grouped in mutually exclusive pixel clusters on a display substrate in a display area. Cluster controllers are disposed on the display substrate and are each connected to the pixels in a pixel cluster to control the pixels to emit light. A display controller external to the display area is connected to each row of pixels in each pixel cluster with a row wire. Each row of pixels in each pixel cluster can be connected with a cluster row wire and the corresponding cluster row wires of each pixel cluster can be connected together. The cluster controllers can be disposed between pixels in the pixel cluster or between adjacent pixel clusters on the display substrate.

18 Claims, 12 Drawing Sheets

(56) References Cited

U.S. PATENT DOCUMENTS

| | | | | |
|---|---|---|---|---|
| 2016/0335966 | A1* | 11/2016 | Kumagai | G09G 3/3614 |
| 2020/0135134 | A1* | 4/2020 | Nakagawa | G02F 1/13336 |
| 2022/0148528 | A1* | 5/2022 | Ooga | G09G 3/3426 |
| 2023/0154390 | A1* | 5/2023 | Ozbas | G09G 3/3426 345/694 |
| 2024/0090284 | A1* | 3/2024 | Kozuma | H05B 33/14 |

* cited by examiner

DISPLAYS WITH HYBRID-CONTROL PIXEL CLUSTERS

FIELD OF THE DISCLOSURE

The present disclosure relates to flat-panel display architectures having passive-matrix-controlled pixel clusters.

BACKGROUND OF THE DISCLOSURE

Flat-panel displays are widely used in conjunction with computing devices, in portable electronic devices, and for entertainment devices such as televisions. Such displays typically employ a pixel array of pixels distributed over a display substrate to display images, graphics, or text. In a color display, each pixel includes light emitters that emit light of different colors, such as red, green, and blue. For example, liquid crystal displays (LCDs) employ liquid crystals to block or transmit light from a backlight behind the liquid crystals and organic light-emitting diode (OLED) displays rely on passing current through a layer of organic material that glows in response to the current. Displays using inorganic light-emitting diodes (LEDs) as pixel elements are also in widespread use for outdoor signage and have been demonstrated in a 55-inch television.

Displays are typically controlled with either a passive-matrix (PM) control scheme employing electronic control circuitry external to the pixel array or an active-matrix (AM) control scheme employing electronic control circuitry in each pixel on the display substrate associated with each light-emitting element. Both organic light-emitting diode displays and liquid-crystal displays using passive-matrix control and active-matrix control are available. An example of such an AM OLED display device is disclosed in U.S. Pat. No. 5,550,066.

In a PM-controlled display, each pixel in a row is stimulated to emit light at the same time while the other rows of pixels do not emit light, and each row of pixels is sequentially activated at a high rate to provide the illusion that all of the rows of pixels simultaneously emit light. In contrast, in an AM-controlled display, data is concurrently provided to and stored in pixels in a row and the rows are sequentially activated to load the data in the activated row. Each pixel in a row emits light corresponding to the stored data when pixels in other rows are activated to receive data so that all of the rows of pixels in the display emit light at the same time, except the row loading pixels. In such AM systems, the row activation rate can be much slower than in PM systems, for example divided by the number of rows in the display. Active-matrix elements are not necessarily limited to displays and can be distributed over a substrate and employed in other applications requiring spatially distributed control.

Passive-matrix row and column control circuits are typically provided on the sides of and external to a display area (e.g., including the display light-emitting pixels) on a display substrate of a display and comprise packaged integrated circuits (ICs). Active-matrix circuits are commonly constructed with thin-film transistors (TFTs) in a semiconductor layer formed over the display substrate and employ a separate TFT circuit to control each light-emitting pixel in the display. The semiconductor layer is typically amorphous silicon or poly-crystalline silicon and is distributed over the entire flat-panel display substrate. The semiconductor layer is photolithographically processed to form electronic control elements, such as transistors and capacitors. Additional layers, for example insulating dielectric layers and conductive metal layers are provided, often by evaporation or sputtering, and photolithographically patterned to form electrical interconnections, or wires. In some implementations, small integrated circuits (ICs) with a separate IC substrate are disposed on a display substrate and control pixels in an AM display. The integrated circuits can be disposed on the display substrate using micro-transfer printing, for example as taught in U.S. Pat. No. 9,930,277.

Both active- and passive-matrix displays use electrical power to control the display and cause pixels to emit light. It is important to reduce the power used by a display to reduce the operating costs of the display and, for portable displays powered by batteries, to increase the operating lifetime of the portable display between battery charges. Furthermore, it is desirable to reduce any display flicker due to pixel updates, for example by increasing the display refresh rate. There is an on-going need, therefore, for improved display efficiency and refresh rate in flat-panel displays.

SUMMARY

The present disclosure includes, among various embodiments, a display comprising pixels distributed in a pixel array having rows and columns, wherein the pixels are grouped in mutually exclusive pixel clusters each comprising ones of the pixels, cluster controllers, each of the cluster controllers connected to the ones of the pixels in one of the pixel clusters to control the ones of the pixels to emit light, and a display controller connected to each row of the pixels. In some embodiments, for each of the rows of the pixels, all of the pixels in the row are connected with a row wire and (i) the row wire for each of the rows of the pixels is separately connected to the display controller, or (ii) the pixel clusters are arranged in rows and one or more columns and, for corresponding rows of the pixels in different rows of the pixel clusters, the row wires for the corresponding rows are connected together and to the display controller. In some embodiments, for each of the pixel clusters, for each column of the pixels in the pixel cluster, the pixels in the column are connected to the cluster controller for the pixel cluster with a corresponding cluster column wire.

According to some embodiments of the present disclosure, the cluster controllers are connected to a display column controller by display column wires. The display controller can comprise the display column controller. The display controller can comprise a display row controller and, for each row of the pixels, the display row controller can be connected to the pixels in the row with a corresponding row wire.

Some embodiments comprise a display column controller (e.g., comprised in the display controller), wherein the cluster controllers are distributed in a cluster array having rows and columns and the display column controller is connected to the cluster controller in each column of the cluster controllers in the cluster array. In some embodiments, the cluster controllers are each separately connected to the display column controller. In some embodiments, the cluster controllers are connected in one or more groups and each of the one or more groups are separately connected to the display column controller. The cluster controllers can be connected in one or more groups and (a) the cluster controllers are operable using token passing or (b) the cluster controllers are operable using pixel data comprising cluster addresses.

In some embodiments, the cluster controllers are distributed in a cluster array of rows and columns and the display controller comprises a display row controller separately connected to each row of the cluster controllers in the cluster array. In some embodiments, for each of the rows of the cluster controllers, each of the cluster controllers in the row is connected together.

Some embodiments of the present disclosure comprise a display substrate having a display area. The pixels and the cluster controllers can be disposed on the display substrate. The pixels can be disposed in the display area on (e.g., over) the display substrate, and at least some of the cluster controllers are disposed between ones of the pixels in the display area. In some embodiments, at least one of the cluster controllers is disposed between the ones of the pixels in one of the pixel clusters. In some embodiments, at least one of the cluster controllers is disposed between rows of the ones of the pixels in the one of the pixel clusters. In some embodiments, at least one of the cluster controllers is disposed between pixels in adjacent ones of the pixel clusters. In some embodiments, at least one of the cluster controllers is disposed between rows of pixels in adjacent pixel clusters on or over the display substrate.

Some embodiments comprise a display substrate and cluster substrates non-native to, and disposed on, the display substrate, wherein, for each of the pixel clusters, the ones of the pixels in the pixel cluster and the cluster controller connected to the ones of the pixels are disposed on one of the cluster substrates. Each of the cluster substrates can comprise a broken (e.g., fractured) or separated cluster tether.

According to some embodiments of the present disclosure, each of the pixels comprises one or more light controllers and the light controllers each comprise a broken (e.g., fractured) or separated light-controller tether.

Each of the cluster controllers can comprise a broken (e.g., fractured) or separated controller tether.

Each of the cluster controllers can be operable to store pixel data for the ones of the pixels in the one of the pixel clusters to which the cluster controller is connected. Each of the cluster controllers can be operable to successively provide the pixel data to rows of the pixels in the pixel cluster and the display controller can be operable to successively activate the rows of the pixels in the pixel cluster. The cluster controllers and the display controller can be operable to simultaneously provide passive-matrix control to all of the pixel clusters so that at least one row of the pixels in each of the pixel clusters simultaneously control light.

Each of the pixels can comprise one or more light controllers and each of the one or more light controllers can be a micro-light-emitting diode. The micro-light-emitting diode can have a length, a width or both a length and a width of no greater than one hundred microns (e.g., no greater than fifty microns, twenty microns, fifteen microns, twelve microns, ten microns, eight microns, five microns, three microns, or one micron or a thickness no greater than fifty microns, twenty microns, fifteen microns, twelve microns, ten microns, eight microns, five microns, three microns, two microns, or one micron).

In some embodiments, each of the pixels, each of the cluster controllers, or each of the pixels and each of the cluster controllers comprises a distinct bare unpacked semiconductor die.

The pixels can be operable to emit light that together forms an image. The pixels and the cluster controllers can be comprised in a backlight. Each of the pixels can correspond to a local-dimming zone of the backlight. Some embodiments comprise a liquid crystal layer disposed over the backlight.

According to some embodiments, the display controller comprises row-control circuits and, for each of the rows of the pixels, all of the pixels in the row are connected with a row wire and: (i) the row wire for each of the rows of the pixels is separately connected to the display controller such that, for each of the rows of the pixels, all of the pixels in the row are separately responsive to one of the row-control circuits, or (ii) the pixel clusters are arranged in rows and one or more columns and, for corresponding rows of the pixels in different rows of the pixel clusters, the row wires for the corresponding rows are connected together and to the display controller such that all of the pixels in the corresponding rows are together responsive to a common one of the row-control circuits.

The display controller can comprise (i) separate row drivers operable to drive signals to each row of the pixels and (ii) a separate row-control circuit that is operable to control the signals for each corresponding row of pixels in all of the pixel clusters in common.

According to embodiments of the present disclosure, a method of operating a display comprises providing a display, providing pixel data to the cluster controllers with the display controller, activating multiple rows of the pixels at a time with the display controller, and providing separate pixel data to each column of the pixels at a time in each of the pixel clusters.

Embodiments of the present disclosure provide display control methods, designs, structures, and devices that reduce the power used by a display and improve the frame rate of the display.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
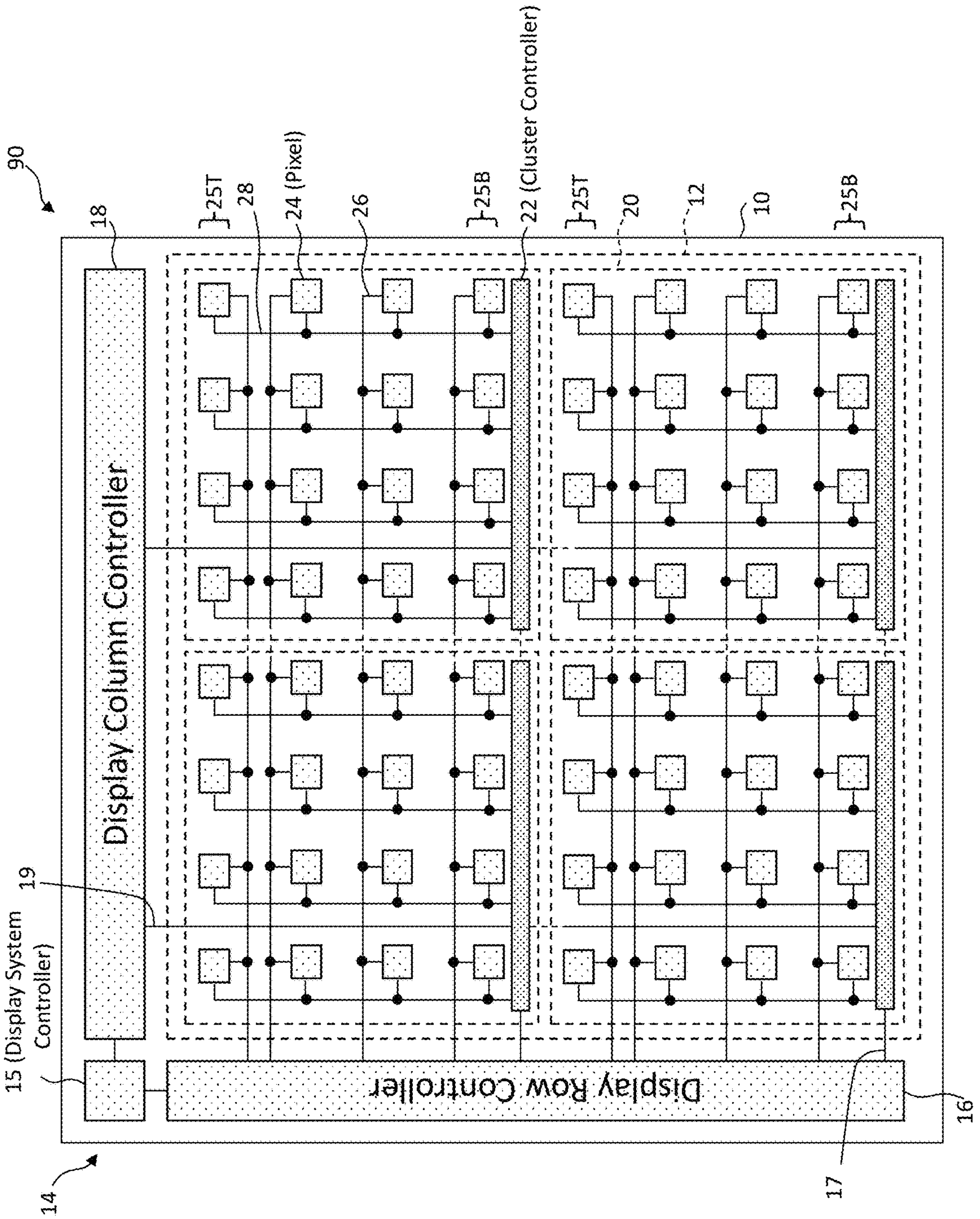
FIG. 1 is a schematic of a display comprising pixel clusters according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF CERTAIN EMBODIMENTS

Embodiments of the present disclosure provide, inter alia, flat-panel displays with reduced power, reduced circuitry, and improved image frame rates. As used herein, the generic term 'display' refers to both an information display that shows information, such as an image, to a viewer and to a local-area-dimming backlight that provides structured illumination, for example to a light-valve display such as a liquid crystal display (LCD). A local-area-dimming backlight can be, for the purposes of this disclosure, equivalent to a low-resolution display because each pixel of the backlight can variably illuminate multiple pixels in an LCD thereby providing local-area dimming. The image frame rate is the temporal rate (frequency) at which new pixel data (image information for each pixel) is displayed by the display.

According to some embodiments of the present disclosure and as illustrated in FIGS. 1, 2, 3A, 3B, and 4, a display 90 comprises pixels 24 distributed in a pixel array having rows and columns of pixels 24 on or over a display substrate 10. Pixels 24 are grouped in mutually exclusive pixel clusters 20 over display substrate 10. FIGS. 1-3B show pixel clusters 20 each having a four-by-four array of pixels 24. Each pixel 24 can comprise one or more light controllers 60, for example micro-light-emitting diodes (micro-LEDs) 60 that emit light, for example a red micro-LED 60 that emits red light when provided with suitable electrical power, a green micro-LED 60 that emits green light when provided with suitable electrical power, and a blue micro-LED 60 that emits blue light when provided with suitable electrical power.

Figure 2:
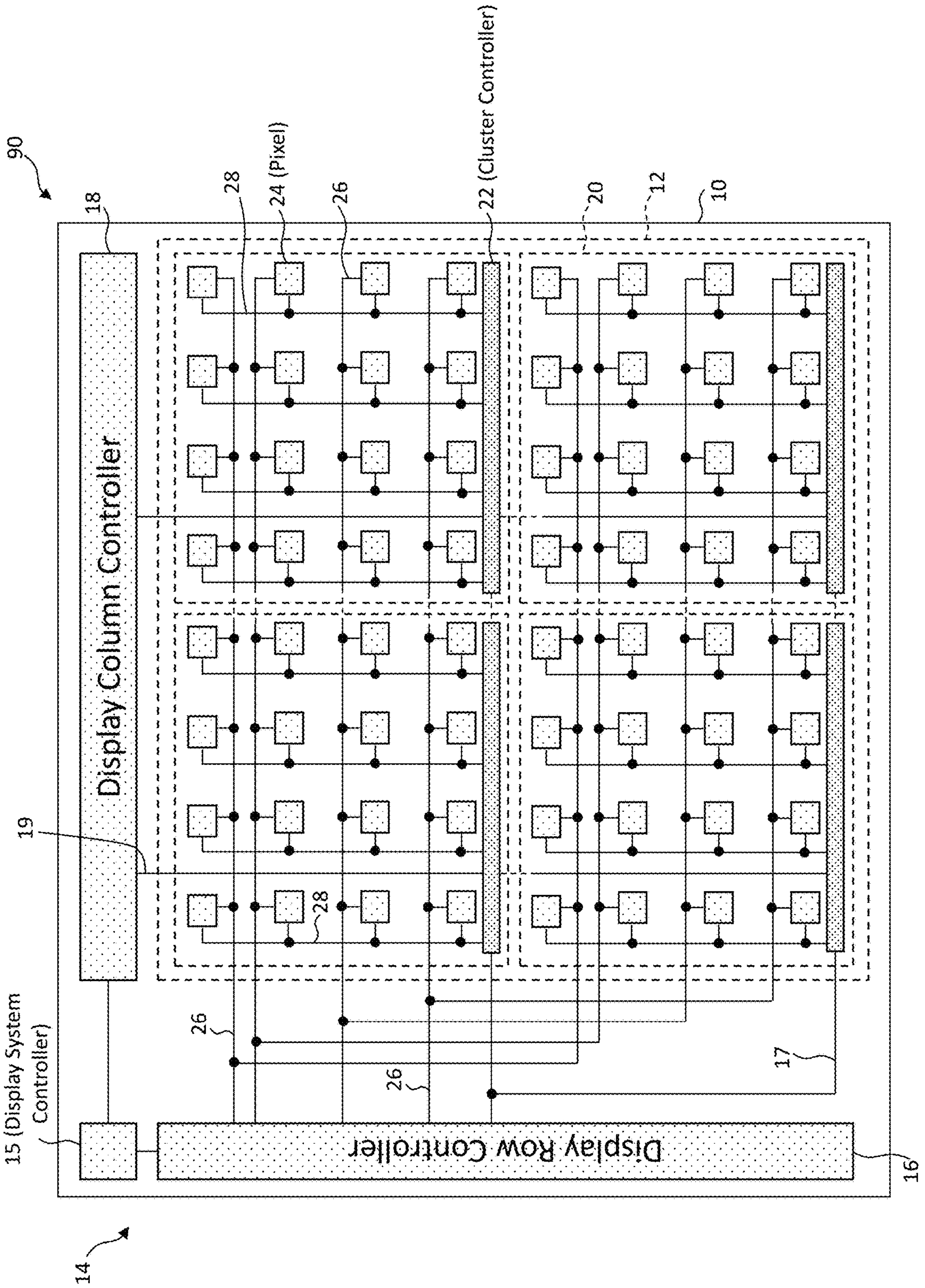
FIG. 2 is a schematic of a display comprising pixel clusters according to illustrative embodiments of the present disclosure.

FIG. 1 and FIG. 2 include dashed portions of (display) row wires 17, 26 and display column wires 19 that indicate that additional pixels 24 and/or pixel clusters 20 can be present (or not). In general, there is no intrinsic minimum or maximum number of pixels 24 that can be in an array or pixel clusters 20 that can be in a cluster array or pixels 24 that can be in a pixel cluster 20. FIGS. 1 and 2 illustrate 4×4 arrays of pixel 24 in each pixel cluster 20 but, in general, any M×N array can be used for a pixel cluster 20. Similarly, in general any M×N array of pixels 24 can be used in a display 90. Different pixel clusters 20 can have, but need not necessarily have, the same size array of pixels 24 in them.

Each pixel cluster 20 comprises a cluster controller 22 disposed on or over display substrate 10 on a common side of display substrate 10. Cluster controller 22 can be connected to each pixel 24 in pixel cluster 20 of the mutually exclusive pixel clusters 20 to control pixels 24 in pixel cluster 20 to emit light. Cluster controller 22 can be an integrated circuit with memory, control, and driving logic, e.g., a silicon circuit. As shown in FIGS. 1 and 2, pixel clusters 20 and cluster controllers 22 can be arranged in a cluster array of rows and columns over a display substrate 10. FIGS. 1-2 show four pixel clusters 20 (and cluster controllers 22) arranged in a two-by-two array. Display substrate 10 has a display area 12 including all of pixels 24 in all of pixel clusters 20. Each column of pixels 24 in a pixel cluster 20 can be connected (e.g., electrically or optically) together with a separate (e.g., unique or independent) cluster column wire 28 so that pixels 24 of each column of pixels 24 in a pixel cluster 20 are connected in common with cluster column wire 28 and are not connected with cluster column wire 28 to pixels 24 in any other column of pixels 24 in pixel cluster 20 or any other pixel cluster 20. Each column of pixels 24 can be connected to cluster controller 22, for example with cluster column wire 28.

Each row of pixels 24 in each pixel cluster 20 can be connected together with a cluster row wire 26. In addition, a display controller 14 can be connected to each row of pixels 24 in each pixel cluster 20 with a row wire 26. Cluster row wires 26 for corresponding rows of pixels 24 in a pixel cluster 20 can be connected together into a single row wire 26, so that pixels 24 in a row of display 90 can be connected together, for example in rows of pixel clusters 20 as in FIG. 1 or for all of pixel clusters 20 as in FIG. 2. Corresponding rows of pixels 24 in pixel clusters 20 are rows of pixels that are in the same relative location in the array of pixels 24 in pixel clusters 20. For example, a top or first pixel row of all of pixel clusters 20 can correspond (as shown with corresponding pixel rows 25T of FIG. 1), a second pixel row adjacent to the first pixel row of all of pixel clusters 20 can correspond, or a bottom pixel row of all of pixel cluster 20 can correspond (as shown with corresponding pixel rows 25B of FIG. 1).

Connecting only rows of pixel clusters 20 enables control by pixel row at the cost of additional row drivers. For example, first cluster row wires 26 of a first row of pixels 24 of multiple pixel clusters 20 are connected together, second cluster row wires 26 of a second row of pixels 24 of multiple pixel clusters 20 are connected together, third cluster row wires 26 of a third row of pixels 24 of multiple pixel clusters 20 are connected together, and so on. Therefore, cluster row wires 26 are not distinguished from row wires 26, although a reference to a cluster row wire 26 typically refers to local pixel 24 row connections within a pixel cluster 20 and a reference to a row wire 26 typically, though not exclusively, refers to the connection for all of pixels 24 connected to row wires 26 in display 90, e.g., multiple cluster row wires 26. Cluster row wires 26 connected to different rows of pixels 24 within a pixel cluster 20 or in different pixel clusters 20 are not connected together. Cluster controller 22 of pixel clusters 20 is not connected to rows of pixels 24 with cluster row wires 26 (e.g., cluster row wires 26 are not connected to cluster controller 22). Thus, row wires 26 (including one or more cluster row wires 26 in different pixel clusters 20) are controlled by display controller 14 external to pixel clusters 20 (and display area 12) and cluster column wires 28 are controlled by cluster controllers 22 internal to pixel clusters 20 (and display area 12).

Display controller 14 can comprise a display system controller 15, a display row controller 16, a display column controller 18, or a combination thereof. Display row controller 14 can be connected to cluster controllers 22 with one or more display row wires 17. Display column controller 16 can be connected to cluster controllers 22 with one or more display column wires 19. Display system controller 15 can be operable to receive pixel data for an image and can control display row controller 16 and display column controller 18. Display row controller 16 can control and provide signals to row wires 26 and display row wire(s) 17. Display column controller 18 can control and provide column signals to cluster controllers 22 on display column wire(s) 19. Display row controller 16 and display column controller 18 can provide signals to cluster controllers 22 using matrix control by selecting a row of cluster controllers 22 at a time and transmitting pixel data to the selected row of cluster controllers at the time with the display column controller 18. Display system controller 15, display row controller 16, and display column controller 18 can be one or more integrated circuits, for example digital or mixed-signal silicon CMOS circuits.

As shown in FIGS. 1 and 2, each column of pixels 24 in each pixel cluster 20 can be electrically connected with a separate (e.g., independent or different) cluster column wire 28, as shown in FIGS. 1 and 2, so that the column connections (cluster column wires 28) in each pixel cluster 20 are separate (e.g., independent or different) from other column connections (cluster column wires 28) in pixel cluster 20 and separate (e.g., independent or different) from other column connections (cluster column wires 28) in other pixel clusters 20. In contrast, a separate (e.g., independent or different) cluster row wire 26 in each pixel cluster 20 electrically connects each row of pixels 24 in the pixel cluster 20. Row wires 26 are not connected to cluster controller 22. Corresponding (e.g., by pixel cluster 20 row) cluster row wires 26 of different pixel clusters 20 are connected together so that pixels 24 in each row of pixels 24 in display 90 are connected together with a separate (e.g., independent) row wire 26 comprising cluster row wires 26 of the different pixel clusters 20. Each row wire 26 is connected to display row controller 16 (e.g., to display controller 14).

In some embodiments, and as shown in FIG. 1, each row wire 26 of a row of pixels 24 in display 90 is separately connected to display row controller 16. This reduces parasitic capacitance and resistance in row wires 26 at the cost of additional row drivers for row wires 26 in display row controller 16 and enables separate control of rows in display 90. As shown in FIG. 2, corresponding cluster row wires 26 in all of pixel clusters 20 are connected together and to display row controller 16. This reduces the number of separately connected row wires 26 and row drivers in display row controller 16 at the cost of longer row wires 26. FIG. 1 shows rows of pixels 24 in rows of pixel clusters 20 connected together; FIG. 2 shows corresponding rows of pixels 24 in rows and columns of pixel clusters 20 connected together. Thus, in embodiments corresponding to FIG. 1, a row signal on a selected row wire 26 connected to a selected row of pixels 24 in a pixel cluster 20 is transmitted to all of pixels 24 in the selected row of pixels 24 in display 90. In embodiments corresponding to FIG. 2, a row signal on a selected row wire 26 connected to a selected row of pixels 24 in a pixel cluster 20 is transmitted to all of pixels 24 in the selected row of pixels 24 (e.g., first row, second row, etc.) in every pixel cluster 20 of display 90. In the FIG. 2 embodiments, display row controller 16 only drives the number of row wires 26 corresponding to the number of rows of pixels 24 in pixel clusters 20, greatly reducing the amount of circuitry in display row controller 16, e.g., by a factor equal to the number of rows of pixel clusters 20 in display 90. In some embodiments, a separate driver can be provided for each pixel 24 row wire 26 as in FIG. 1 responsive to a single logic, control, and timing circuit, thereby reducing the logic, control, and timing circuitry, but not the driver circuit, and reducing the length of each row wire 26.

Display column controller 18 can be connected with a separate, independent, and different display column wire 19 to each column of pixel cluster controllers 22 in display 90 so that each column of cluster controllers 22 in each column of pixel clusters 20 are connected in common with a separate, independent, and different display column wire 19 and can provide matrix control to cluster controllers 22. In some embodiments, cluster controllers 22 individually receive data directly from display column controller 18, in groups of cluster controllers 22 using token passing control methods, or as a single group with pixel data comprising cluster addresses. Display column wires 19 are separate from cluster column wires 28. Display column controller 18 can provide control signals, e.g., pixel data or timing signals, to columns of pixel clusters 20 and cluster controllers 22.

Optionally, display row controller 16 can provide row control signals (e.g., timing signals such as clocks, pulse modulation signals, or other control signals) to rows of cluster controllers 22 using display row wires 17. Display row controller 16 can also provide control or timing signals to rows of pixels 24 in pixel clusters 20 using row wires 26, e.g., to multiple rows of pixels 24 corresponding to a common row of pixels 24 in pixel clusters 20. Embodiments of the present disclosure are not limited by methods of distributing pixel data to cluster controllers 22 or providing control or timing signals to cluster controllers 22.

Figure 3A:
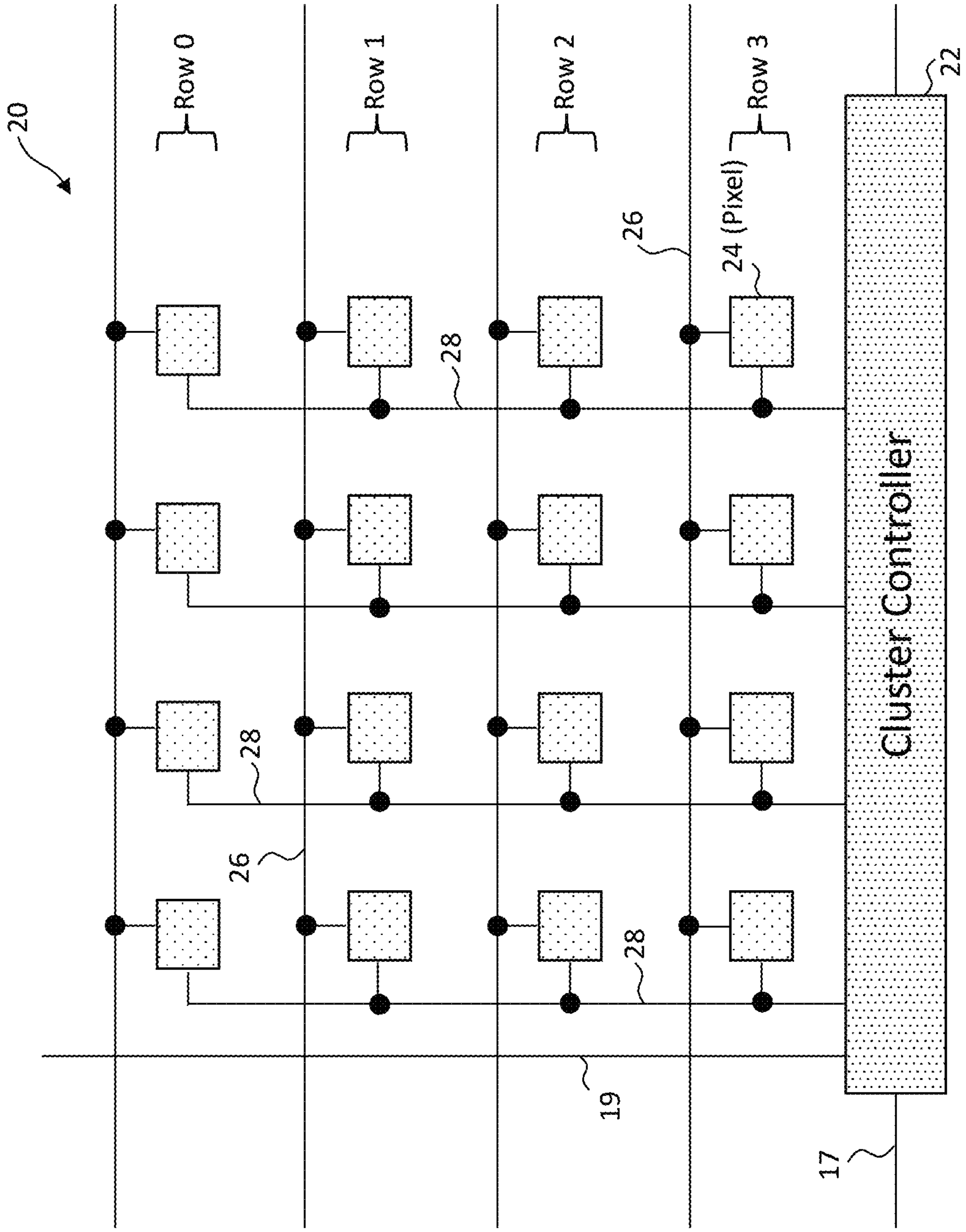
FIGS. 3A and 3B are schematics of pixel clusters according to illustrative embodiments of the present disclosure.
Figure 3B:
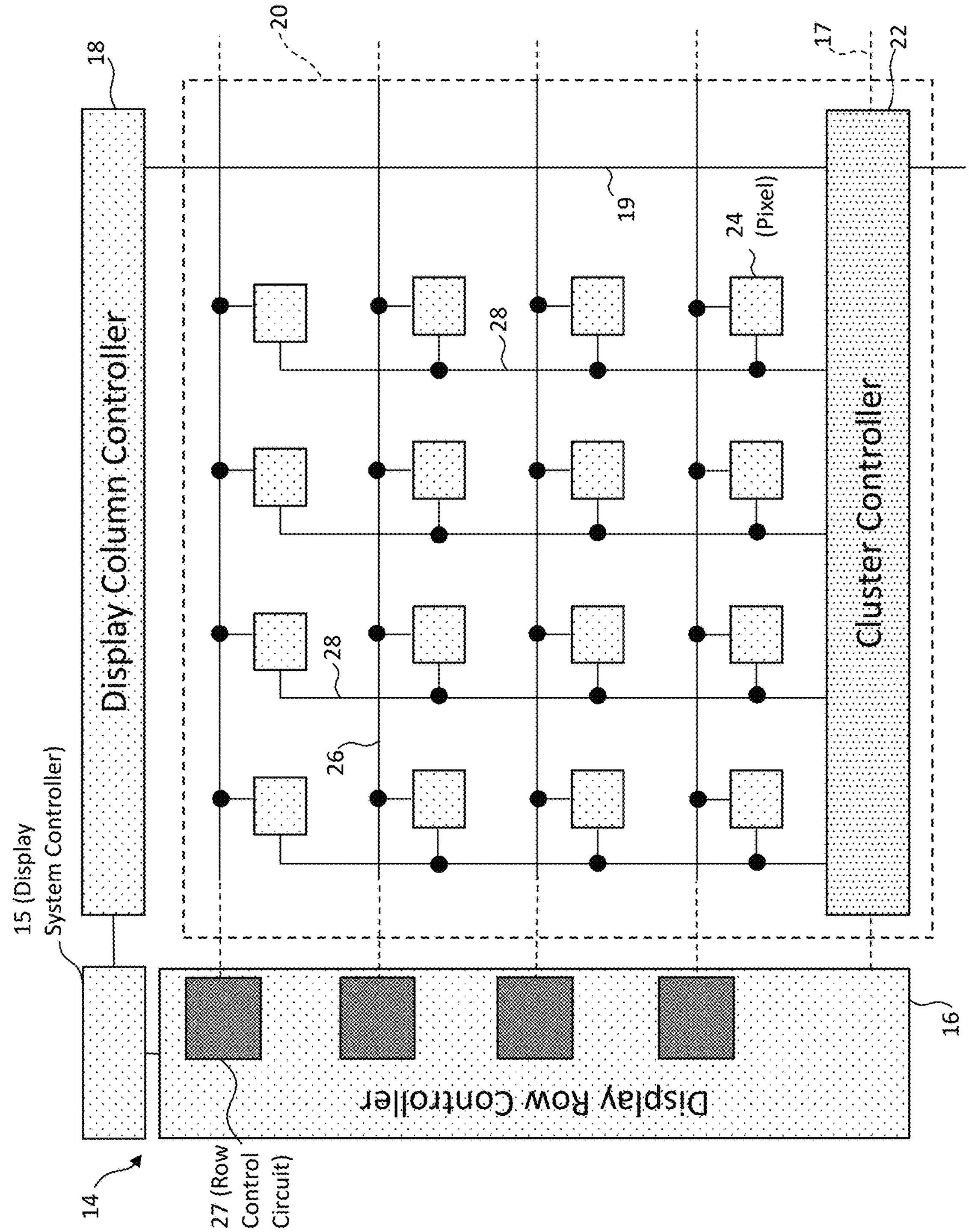

As shown in the detail of FIG. 3A, pixel cluster 20 comprises a pixel array of pixels 24 arranged in rows and columns. The rows of pixels 24 in a pixel cluster 20 are connected (e.g., electrically or optically) with a cluster row wire 26 and the columns of pixels 24 in a pixel cluster 20 are connected (e.g., electrically or optically) with a cluster column wire 28. Each column of pixels 24 is separately connected with a cluster column wire 28 to pixel cluster controller 22. Cluster controller 22 can be connected (e.g., electrically or optically) with a display column wire 19 and, optionally, with a display row wire 17. As shown in the detail of FIG. 3B, cluster controller 22 is connected to display column controller 18 with display column wire 19 and, optionally to display row controller 16 with display row wire 17. Display row and column controllers 16, 18 can provide signals to cluster controllers 22 in pixel clusters 20.

Figure 3C:
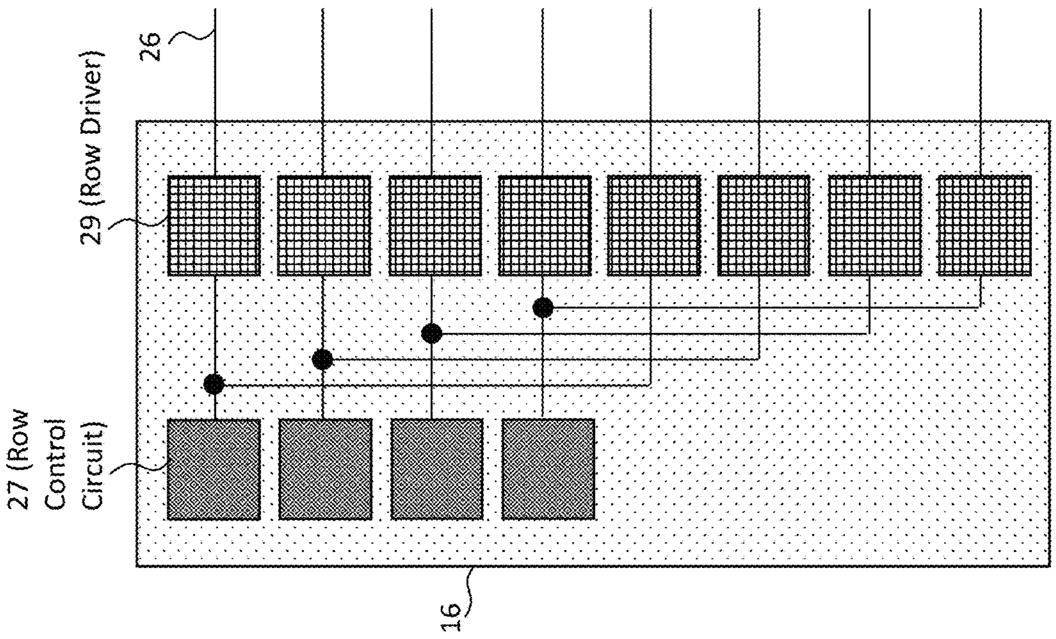
FIG. 3C is a schematic of row-control circuits and row drivers in a display row controller according to illustrative embodiments of the present disclosure.

FIG. 3B illustrates row-control circuits 27 that drive each row wire 26 with signals. In some embodiments, each individual and separate row wire 26 is controlled by an individual and separate row-control circuit 27. In the embodiments of FIG. 1, for example, each row of pixels 24 in display 90 can be driven by a separate row-control circuit 27 (eight row-control circuits 27 in FIG. 1). In the embodiments of FIG. 2, for example each row of pixels 24 in pixel clusters 20 can be driven by a separate row-control circuit 27 (four row-control circuits 27 in FIG. 2). In some embodiments, row-control circuits 27 comprise row drivers 29 to drive signals onto row wires 26. In some embodiments and as shown in FIG. 3C, row drivers 29 are separate from row-control circuits 27 so that multiple row drivers 29 can be controlled by a common row-control circuit 27. Thus, for example, in an embodiment combining FIGS. 1 and 2 and as shown in FIG. 3C, a separate row wire 26 connects each row of pixels 24 in display 90, a separate row driver 29 drives each separate row wire 26, but a row-control circuit 27 controls all of the row drivers 29 driving row wires 26 connected to corresponding rows of pixels 24 in different rows of pixel clusters 20 in common. Thus, only the number of row-control circuits 27 as shown in FIG. 2 are required and each row wire 26 has a separate row driver 29 as in FIG. 1 so that, at the cost of a row driver 29 for each row of pixels 24 in display 90, row wires 26 are shorter and have less impedance and resistance, as in FIG. 1 embodiments, with fewer row-control circuits 27, as in FIG. 2 embodiments.

Figure 4:
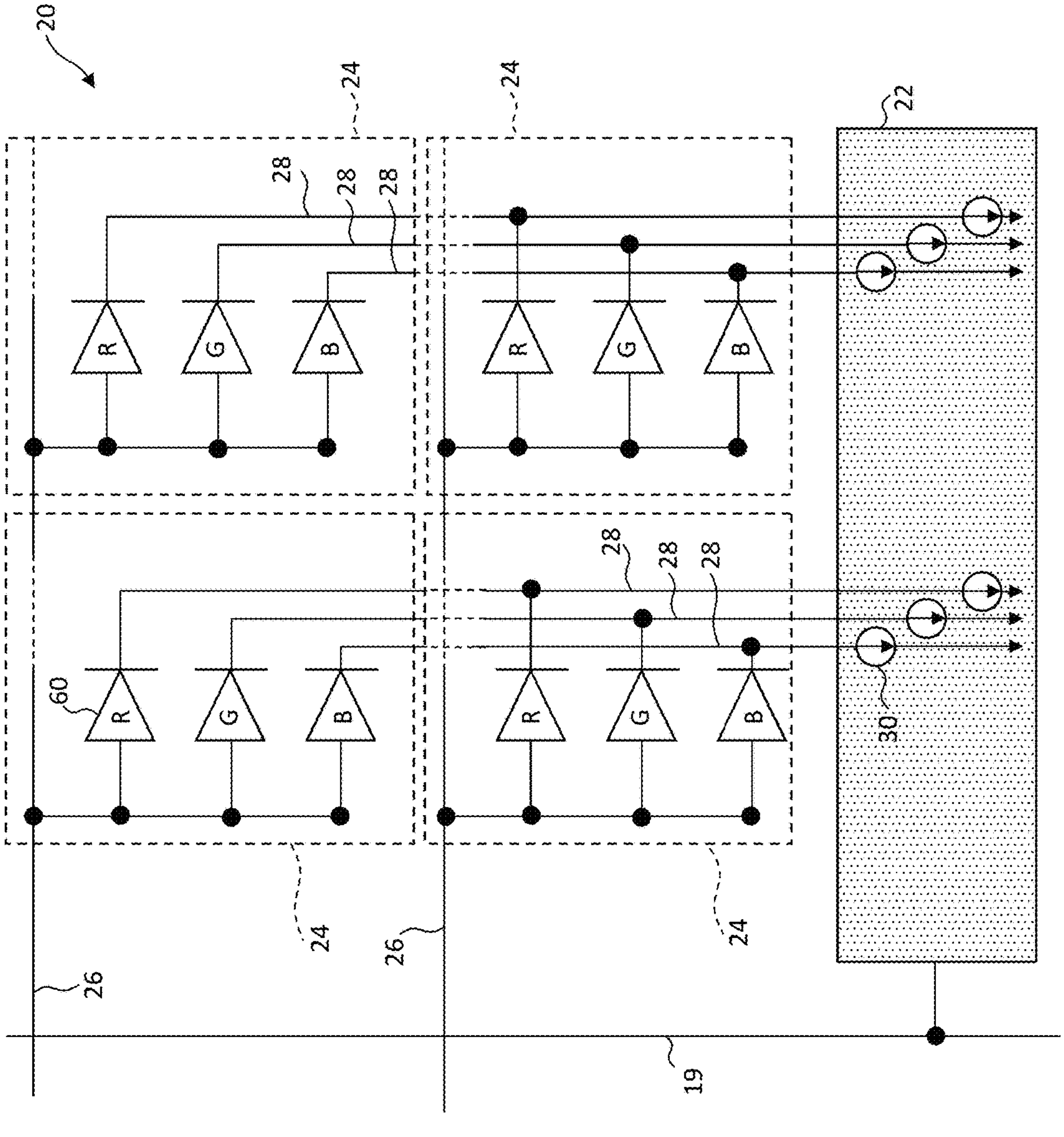
FIG. 4 is a schematic circuit diagram of a pixel cluster according to illustrative embodiments of the present disclosure.

As shown in FIG. 4, each pixel 24 can comprise multiple light controllers 60, e.g., micro-LEDs 60, that can emit different colors of light, for example red, green, and blue. Micro-LEDs 60 that emit each of the different colors of light can be connected as discussed above for each pixel 24, e.g., with rows of micro-LEDs 60 that emit the same color of light connected to common cluster row wires 26 and display row controller 16 and columns of micro-LEDs 60 that emit the same color of light connected to common cluster column wires 28 and cluster controller 22. Pixels 24 and micro-LEDs 60 can be controlled with cluster current sources or sinks 30 that are logically controlled by cluster controller 22 to provide electrical energy to micro-LEDs 60 according to pixel data stored by cluster controllers 22. A current source or sink can also be provided by display row controller 16 to complement cluster current sources or sinks 30 in pixel clusters 20 (e.g., provide a power or ground signal) to enable pixels 24 and light controllers 60 to emit light.

Figure 5:
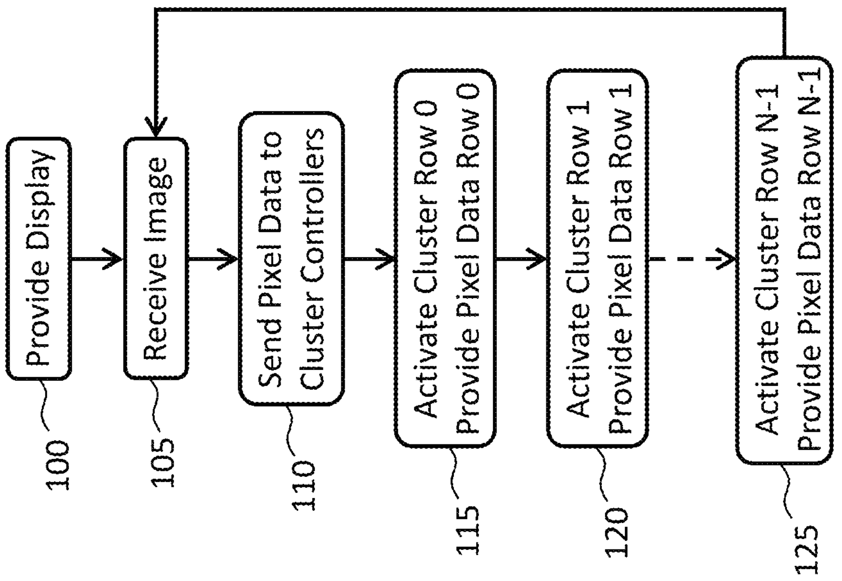
FIG. 5 is a flow diagram according to illustrative embodiments of the present disclosure.

As illustrated in FIG. 5, embodiments of the present disclosure can operate in a mixed (hybrid) active- and passive-matrix control method. Each pixel cluster 20 can be operated as a passive-matrix array and the cluster array of pixel clusters 20 and cluster controllers 22 can be operated as an active-matrix array. In step 100, a display 90 is provided with a pixel array of pixels 24 grouped into mutually exclusive pixel clusters 20 controlled by cluster controllers 22 and display controller 14 (e.g., display row controller 16), as shown in FIGS. 1 and 2. In step 105, display controller 14 receives an image, e.g., comprising pixel data to be displayed by pixels 24 in display 90. In step 110, the pixel data is distributed by display controller 14 (e.g., using display column controller 18) through display column wires 19 (and optionally using control or timing signals from display row controller 16 through display row wires 17) to pixel cluster controllers 22. Pixel cluster controllers 22 store the pixel data.

Once pixel data is stored in cluster controller 22, the pixel data can be displayed by pixels 24 under the control of cluster controllers 22 and display controller 14. In step 115, display row controller 16 activates a row (e.g., row zero) of pixels 24 in pixel clusters 20 of display 90 through row wires 26 and cluster controllers 22 provide pixel data to the activated row of pixels 24 through cluster column wires 28. Activation can include providing a desired voltage (Vdd for micro-LEDs 60 or a ground) that complements signals provided by cluster controllers 22 to provide a forward-biased voltage for micro-LEDs 60. For example, if cluster controllers 22 provide a modulated high (on) and zero (off) voltage to activate a row of micro-LEDs 60, display row controllers 16 can provide a zero voltage (current sink) when activated so that micro-LEDs 60 are suitably biased to emit light. When not activated, display row controllers 16 can provide a Vdd voltage (or high-impedance tri-state) to individual rows of micro-LEDs 60 in each pixel cluster 20 so that micro-LEDs 60 are reverse biased or effectively removed from the circuit and do not emit light.

Once row zero of pixels 24 are displayed for a pre-determined amount of time, display row controller 16 activates a subsequent (e.g., successive or sequential) row (e.g., row one) of pixels 24 in pixel clusters 20 of display 90 through row wires 26 and cluster controllers 22 provide pixel data to the activated row of pixels 24 through cluster column wires 28 in step 120 for the pre-determined amount of time. The process continues by activating successive (e.g., sequential) rows of pixels 24 in pixel clusters 20 until pixel data for all of the rows of pixels 24 in pixel clusters 20 have been displayed (in step 125) for the pre-determined amount of time. The process then repeats by receiving a successive image in step 105.

FIG. 3A illustrates a pixel cluster 20 with four rows of pixels 24 (so that N=4 and rows 0 to N−1 are successively and iteratively displayed, where N is the number of rows of pixels 24 in a pixel cluster 20). Because pixels 24 in pixel clusters 20 are displayed successively, they should be displayed at a sufficient rate that the human visual system cannot distinguish the display of individual rows of pixels 24. However, as shown in FIG. 2, pixels 24 in corresponding rows of multiple pixel clusters 20 can be displayed at a same time so that the image frame rate of embodiments of the present disclosure can be M times faster than a conventional passive-matrix display, where M is the number of rows of pixel clusters 20, by displaying image pixel data in a selected pixel 24 row of all of pixel clusters 20 at a same time. At the same time, by using passive-matrix control for pixels 24 in each pixel cluster 20, the amount of pixel control circuitry is greatly reduced since each pixel 24 does not require a separate storage and driving circuit.

New pixel data (e.g., from a subsequent image) can be transmitted to pixel cluster controllers 22 independently of displaying pixel data from a prior image (e.g., using double buffering techniques in cluster controllers 22) so that step 105 and step 110 can be performed at the same time as steps 115 to 125 to load a successive image into pixel clusters 20 while pixel clusters 20 can display a prior stored image. Cluster controllers 22 can be updated in any order or can be updated by sequential pixel cluster 20 rows. In some embodiments only some cluster controllers 22 are updated, or in some embodiments only a portion of the pixel data in a cluster controller 22 is updated.

In embodiments of the present disclosure, pixels 24 are driven using a temporal pulse method such as pulse-width modulation (PWM) or pulse-density modulation that temporally varies a constant-current signal (e.g., on at a pre-determined non-zero current or off at a zero current). If the temporally modulated signal has a fast enough frequency, the human visual system cannot distinguish the pulses and simply perceives an average luminance of pixels 24 over the duration of the image frame (the frame period).

A pulse-width modulated pixel 24 control method can be implemented in various ways. In one way, display row controller 16 provides a current sink (e.g., a ground) or current source (e.g., a non-zero voltage) to activate a selected row of pixels 24 for each pixel cluster 20 connected to a common row wire 26 at the same time that cluster controller 22 provides a pixel data signal to each cluster column wire 28 corresponding to the pixel data of pixels 24 for each pixel cluster 20 that are activated in the selected row of pixels 24. The pixel data signal can be a pulse-width modulation signal controlled by cluster controllers 22 to provide a corresponding pixel data signal to cluster column wire 28. The pixel data signal for a pixel 24 can be generated by logically combining each pulse of the PWM signal with a bit of the pixel data for that pixel 24 (e.g., setting the pulse to a zero value where the corresponding bit is a zero and setting the pulse to a one value where the corresponding bit is a one) and then driving a micro-LED 60 with a driver responsive to the pixel data signal. A generic PWM signal (e.g., a series of PWM pulses of the desired frequency) can be generated within each cluster controller 22 or provided in common to each cluster controller 22 in display 90, e.g., transmitted through display row wire 17. Alternatively, a common clock signal can be provided in common to cluster controllers 22 through display row wire 17 from which each cluster controller 22 can generate a PWM signal. In some embodiments, a separate display row wire 17 is provided to each row of cluster controllers 22 as shown in FIG. 1 to reduce impedance on display row wires 17; in some embodiments a common display row wire 17 is provided to all cluster controllers 22 as shown in FIG. 2 to reduce circuitry for driving row wires 17. In some embodiments, a common clock signal can be derived from control and pixel data signals provided by display column controller 18 through display column wires 19.

According to embodiments of the present disclosure, a hybrid-control pixel cluster display 90 has improved frame rates compared to a conventional passive-matrix display because image pixels 24 can be updated M times more often where M is the number of rows of pixel clusters 20. Moreover, hybrid-control pixel cluster display 90 has reduced hardware (integrated circuit) requirements and reduced costs compared to a conventional active-matrix display because display controller 14 (e.g., display row controller 16) requires fewer circuits since only N display row lines are independently controlled by display row controller 16 where N is the number of rows of pixels 24 in a pixel cluster 20 (e.g., as shown in FIG. 2) and because fewer control circuits are needed in each pixel 24 since each cluster controller 22 supports multiple pixels 24, for example requiring fewer drive circuits and timing circuits. Embodiments of the present disclosure also have manufacturing advantages. All of pixels 24 (e.g., micro-LEDs 60) and cluster controllers 22 can be disposed together on a common side of display substrate 10 so that no circuits need be disposed on a back side of display substrate 10. Thus, display 90 can provide passive-matrix control to multiple pixel clusters 20 at a same time without requiring control circuits disposed on a back side of display substrate 10 and through-substrate electrical connections between the back-side control circuits and micro-LEDs 60, significantly reducing manufacturing costs.

Pixel clusters 20 and pixels 24 can be disposed on a display substrate 10, for example a glass or polymer substrate, within a display area 12 comprising all of pixels 24 and at least some of cluster controllers 22. Display area 12 can be, for example, a convex hull comprising all of pixels 24 or light controllers 60. Thus, at least a portion of cluster controllers 22 can be disposed between pixels 24 on or over display substrate 10 in display area 12, for example between pixels 24 in a pixel cluster 20 (as shown in FIGS. 1 and 2) or between pixels 24 in spatially adjacent pixel clusters 20 (as shown in FIGS. 3A and 3B for a single pixel cluster 20). Display controller 14 (e.g., display row controller 16 and/or display column controller 18) can be disposed on or over display substrate 10 external to display area 12, for example adjacent to the edges or sides of display area 12. Display row controller 16, display column controller 18, and display controller 14 can be packaged integrated circuits (e.g., silicon control, timing, and drive circuits) mounted on or over display substrate 10. According to some embodiments, display row controller 16, display column controller 18, and display controller 14 can each be one or more unpackaged bare die, for example disposed on or over display substrate 10 by micro-transfer printing, or a thin-film transistor circuit disposed on or over display substrate 10.

According to some embodiments of the present disclosure, cluster controller 22 can comprise one or more integrated circuits, for example one or more unpackaged, micro-transfer printed, bare die disposed at least partly or completely between pixels 24 e.g., between rows of pixels 24 or columns of pixels 24, in display area 12. Cluster controller 22 of pixel cluster 20 can comprise digital, analog, or mixed signal circuits to provide control to pixels 24 in pixel cluster 20. For example, cluster controller 22 can comprise any one or more of memory circuits, logic circuits, state-machine circuits, timing circuits, programmable circuits, and light-controller 60 driving circuits. Cluster controller 22 of pixel cluster 20 can comprise logically controllable cluster current source or sink 30 circuits, e.g., for each column of pixels 24 in pixel cluster 20. Such circuits are known to those having skill in the art.

According to embodiments of the present disclosure and as illustrated in FIG. 4, pixels 24 of pixel clusters 20 can comprise one or more light emitters 60, for example micro-light-emitting diodes 60 that each emit different colors of light, for example red micro-LEDs 60 that emit red light, green micro-LEDs 60 that emit green light, and blue micro-LEDs 60 that emit blue light when provided with enough current at a suitable voltage. Cluster row signals on row wires 26 (e.g., cluster row-select signals) provided by display row controller 16 and cluster column signals 28 (e.g., cluster column-data signals) provided by cluster controllers 22 can provide enough current at suitable voltages to drive each of micro-LEDs 60 in each pixel 24. Display or cluster row signals on display row wires 17 and cluster row wires 26 and display column or cluster column signals on display column wires 19 and cluster column wires 28 can comprise one or more of row-select, timing, clock, PWM, or column-data (pixel-data) signals but are not limited to such and can implement any suitable control and data function desired.

Pixels 24 can comprise light emitters 60, for example light-emitting diodes 60, for example inorganic light-emitting diodes 60, for example micro-light emitting diodes 60 having a length or width no greater than one hundred microns, for example no greater than fifty microns, no greater than twenty microns, no greater than fifteen microns, no greater than twelve microns, no greater than ten microns, or no greater than five microns, and a thickness no greater than fifty microns, for example no greater than twenty microns, no greater than ten microns, or no greater than five microns. As discussed further below, micro-light-emitting diodes 60 can be bare, unpackaged die, for example integrated circuit die, and can be micro-transfer printed from a micro-light-emitting diode 60 source wafer to display substrate 10 and can comprise a broken (e.g., fractured) or separated LED tether 61 (e.g., light-controller tether 61) as a consequence of micro-transfer printing. Cluster controllers 22 can likewise be unpackaged bare die, for example integrated circuit die, and can be micro-transfer printed from a cluster controller 22 source wafer to display substrate 10 and comprise a broken (e.g., fractured) or separated controller tether 23 as a consequence of micro-transfer printing. Cluster controllers 22 can have a length or width no greater than two hundred microns, for example no greater than one hundred microns, no greater than fifty microns or no greater than twenty microns, and a thickness no greater than fifty microns, for example no greater than twenty microns, no greater than ten microns, or no greater than five microns. Micro-transfer printed integrated circuits, for example micro-LEDs 60, are relatively small and can therefore be provided at a high density and resolution on display substrate 10. Likewise, cluster controllers 22 can be very small and can therefore be provided between pixels 24 in display area 12 on or over display substrate 10.

Figure 6:
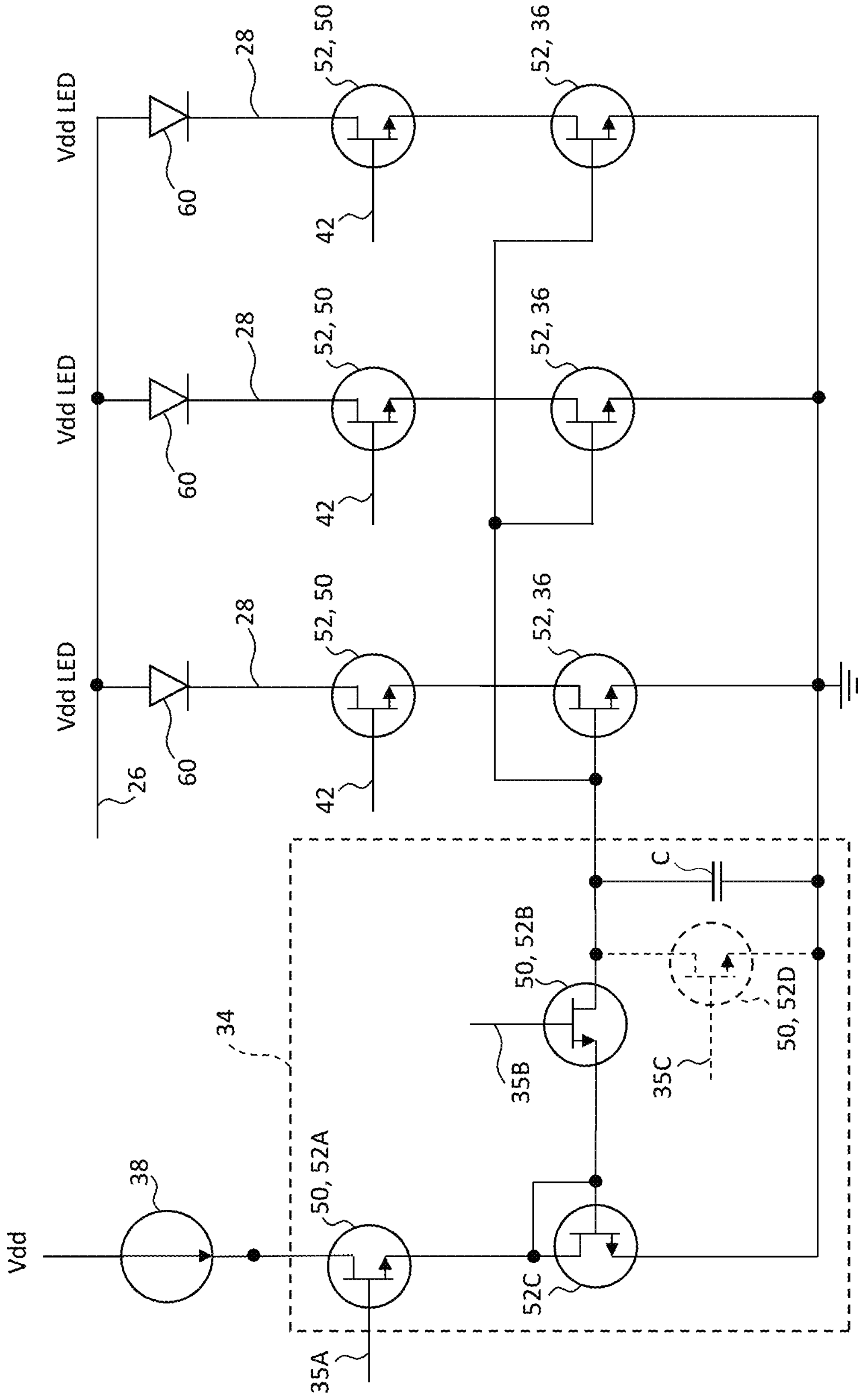
FIG. 6 is a circuit diagram of a current source and pixel control circuit according to illustrative embodiments of the present disclosure.

FIG. 6 illustrates generic cluster current source transistors 36 suitable for cluster controller 22 that are enabled with enable circuit 34 (e.g., when activated), for example comprising two control transistors 52A, 52B responsive to enable circuit control signals 35A and 35B (collectively enable circuit control signal 35), respectively and a transistor 52C with a connected source and drain driving a capacitor C to form a sample and hold circuit that controls the gate of cluster current source transistor 36 (a transistor 52). When the gate voltage control signal on current source transistor 36, 52 is low, leakage through capacitor C and the cluster current source transistor 36, 52 is reduced, saving power. In some embodiments, an optional control transistor 52D responsive to enable circuit control signal 35C can short capacitor C and ensure that the gate of current source transistor 36, 52 is grounded to further reduce leakage in capacitor C and current source transistors 36. When the gate voltage is high current can flow through cluster current source transistors 36. The current source can be used for every row of pixels 24 (or micro-LEDs 60 emitting light of a common color), saving circuitry. The current provided by cluster current source transistor 36 can depend on the size of transistor 52 in cluster current source transistor 36 (a larger transistor 52 can provide a greater current) or current reference 38 and can be adapted to the current needs of micro-LEDs 60 that emit different colors of light (e.g., red, green, blue). As shown in FIG. 6, the gate control signal is connected to multiple cluster current source transistors 36 in parallel so that the multiple cluster current source transistors 36 are enabled with a common timing signal (e.g., a generic PWM signal) and can drive multiple micro-LEDs 60. In some embodiments, enable circuit 34 drives only a single cluster current source transistor 36. According to some embodiments, current reference 38 can be part of enable circuit 34 or can be shared among multiple enable circuits 34 (as shown with the dotted line connection to the output of current reference 38) in order to save circuitry. In some embodiments, one or more current references 38 can be disposed in a display row controller 16 and connected to one or more cluster controllers 22, saving circuitry in cluster controller 22.

Once cluster current source transistor 36 is enabled, the provided current can be turned on or off with a switch 50 (for example comprising one or more transistors 52) in response to a timing signal 42 and the current provided to a cluster row wire 26 or cluster column wire 28 to turn micro-LEDs 60 on or off. According to some embodiments of the present disclosure, cluster controller 22 is a passive-matrix controller for pixels 24 in pixel cluster 20 and timing signal 42 is a pulse-width modulation pixel data or pulse-density modulation pixel data signal that uses temporal modulation to control the luminance of pixels 24 at a constant current. Timing signal 42 can be responsive to a generic PWM signal (e.g., having pulses corresponding to every bit B in a B-bit pixel data value) combined with bits B of the pixel data value (e.g., with an AND gate) to turn on or off each individual pulse and thereby control micro-LEDs 60 with a temporal control signal representative of the pixel data value at a constant-on or constant-off current. Each row of pixels 24 in pixel cluster 20 (shown in FIG. 6 with three micro-LEDs 60) can be controlled with the same enable circuit 34 and cluster current source transistors 36 but with different column wires 28, saving circuitry, and controlled with timing signal 42 responsive to the pixel data for each specific pixel 24. Circuits as shown in FIG. 6 can be made in digital, analog, or mixed signal circuits, for example in a silicon integrated circuit.

According to embodiments of the present disclosure, micro-LEDs 60 emit light most efficiently at a particular current. This efficient current can be different for different micro-LEDs 60, for example micro-LEDs 60 made with different materials or that emit different colors of light. It is useful, therefore, to operate micro-LEDs 60 at their most efficient current to provide a power-efficient display and to select different efficient currents for different corresponding types of micro-LEDs 60, for example different size transistors 52 for each column of different types of micro-LEDs 60. Passive-matrix control can provide higher currents for shorter periods of time that, in some embodiments, match the currents needed for efficient micro-LED 60 operation.

Micro-LED 60 in pixel 24 can emit different amounts of light in response to a control signal (e.g., timing signal 42) and the number of light levels (the luminance) is determined by the range of the control signal. Transistors 52 (and some other components, such as capacitors) in cluster current source transistors 36 can leak current and the larger the transistor 52 (or other components) the more current can leak. Leakage can be reduced by reducing the voltage provided to a gate of a transistor or across a capacitor, for example by reducing the voltage output by enable circuit 34. Although the leakage of a single transistor 52 can be relatively small, if the leakage occurs for every pixel 24 in a high-resolution display, the power wasted can be considerable, especially for portable display applications in which power efficiency is an important consideration. Thus, leakage is reduced if cluster current source transistor 36 for a micro-LED 60 provides only the current required for a desired LED luminance. If additional current is provided but not used in a cluster current source transistor 36, additional current leakage also occurs, reducing efficiency. Thus, using different-sized cluster current source transistors 36 for different types of micro-LEDs 60 for shorter passive-matrix periods of time can be more power efficient.

Figure 7:
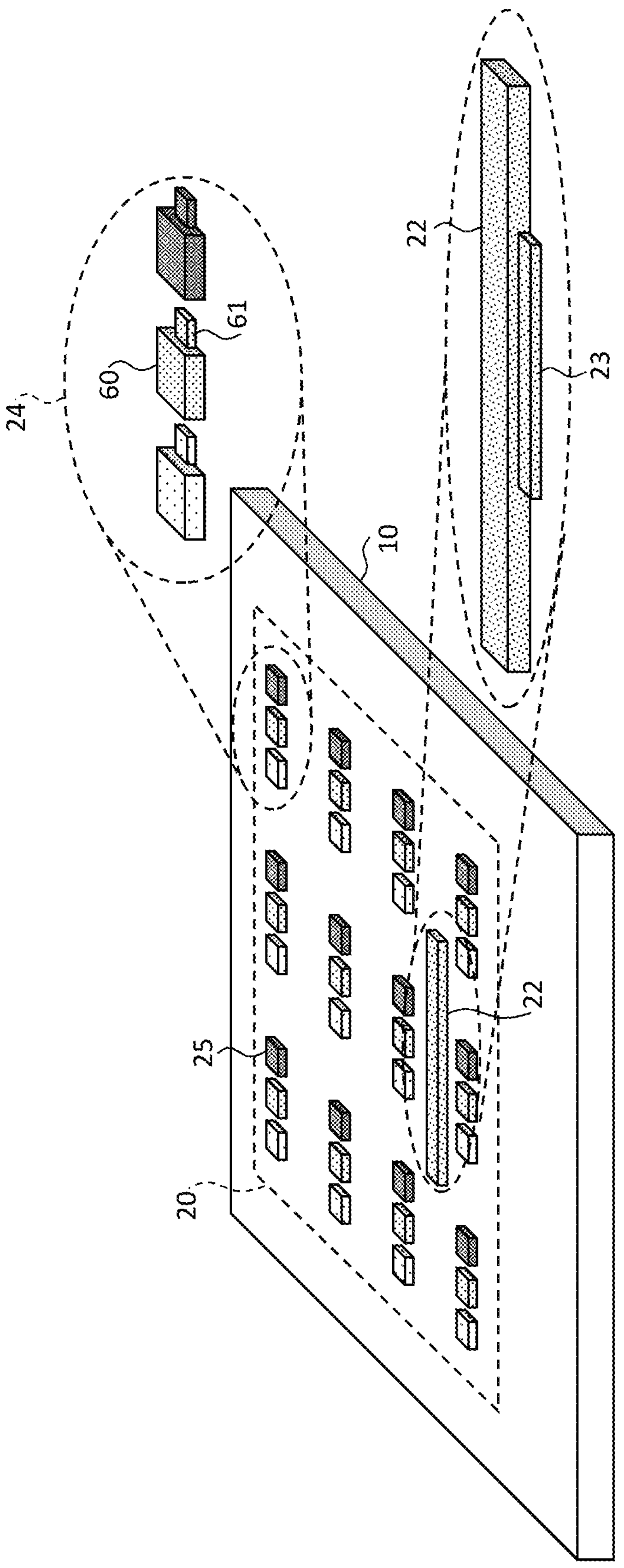
FIG. 7 is a perspective of a pixel cluster and display according to illustrative embodiments of the present disclosure.

Displays 90 according to embodiments of the present disclosure can comprise micro-light-emitting diodes (micro-LEDs) 60 made with compound semiconductor materials and LED substrates separate, distinct, and individual from display substrate 10. As shown in FIG. 7, each micro-LED 60 can comprise a broken (e.g., fractured) or separated LED tether 61 broken (e.g., fractured) or separated as a consequence of micro-transfer printing micro-LEDs 60 from an LED source wafer (e.g., a compound semiconductor substrate such as GaN or GaAs) to display substrate 10. Similarly, cluster controller 22 can comprise a broken (e.g., fractured) or separated controller tether 23 broken (e.g., fractured) or separated as a consequence of micro-transfer printing cluster controller 22 from a cluster-controller source wafer (e.g., a semiconductor substrate such as silicon) to display substrate 10. Thus, in some embodiments micro-LEDs 60 and cluster controller 22 are disposed directly on display substrate 10 or directly on layers disposed on display substrate 10. FIG. 7 illustrates one pixel cluster 20 disposed on display substrate 10 but displays 90 of the present disclosure can comprise multiple pixel clusters 20 disposed on display substrate 10, for example a cluster array of pixel clusters 20 defining a display area 12 as shown in FIG. 1.

Figure 8:
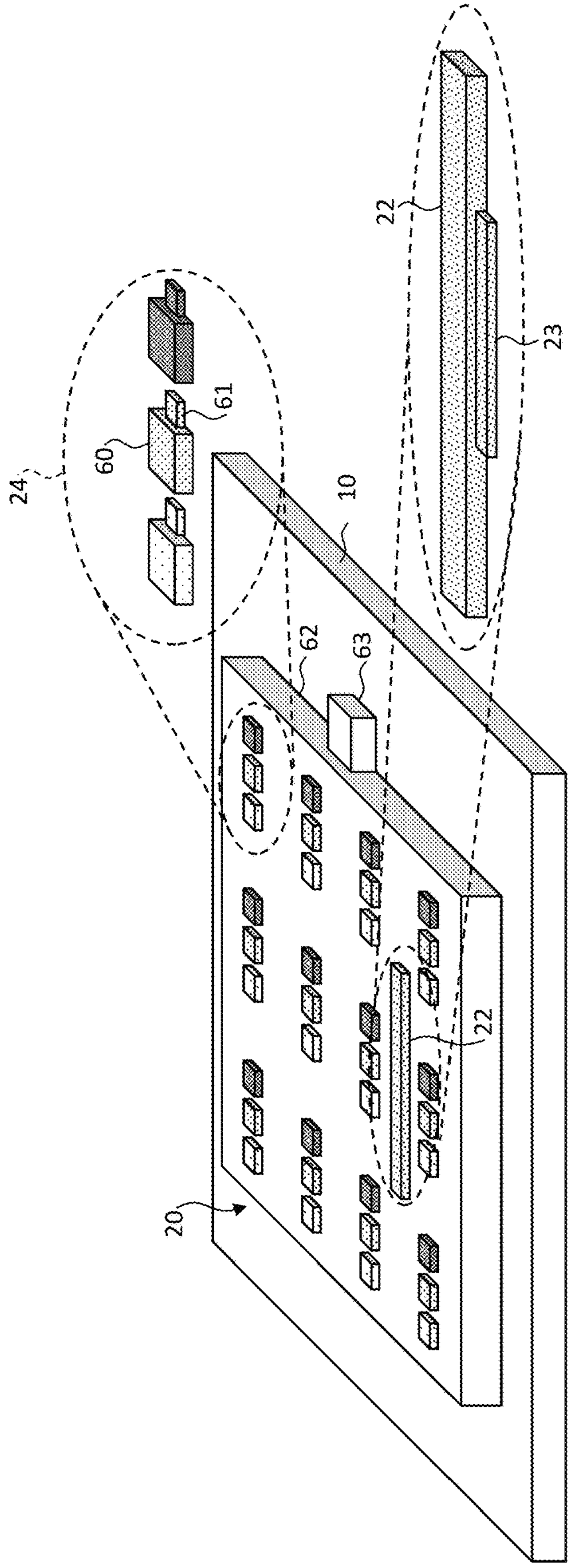
FIG. 8 is a perspective of a pixel cluster and display with a cluster substrate according to illustrative embodiments of the present disclosure.

In some embodiments, and as illustrated in FIG. 8, micro-LEDs 60 and cluster controller 22 are micro-transfer printed onto a cluster substrate 62 that is separate, individual, and distinct from display substrate 10 and separate, individual, and distinct from micro-LEDs 60 and any LED substrates and cluster controller 22 and any cluster controller substrate. Micro-LEDs 60 and a cluster controller 22 of a pixel cluster 20 can be disposed on cluster substrate 62. A single pixel cluster 20 can be disposed on a single cluster substrate 62 or multiple pixel clusters 20 can be disposed on a single cluster substrate 62. Cluster substrates 62 can be disposed on display substrate 10, for example by micro-transfer printing or other assembly processes, such as surface-mount and pick-and-place technologies. Pixel clusters 20 on cluster substrates 62 can be surface-mount devices or can be micro-assembled, for example by micro-transfer printing cluster substrates 62 from a cluster source wafer to display substrate 10 so that cluster substrates 62 can comprise a broken (e.g., fractured) or separated cluster tether 63 as a consequence of micro-transfer printing. Cluster substrates 62 can comprise a same material as display substrate 10 or can be a different material such as a semiconductor, for example silicon.

Figure 9:
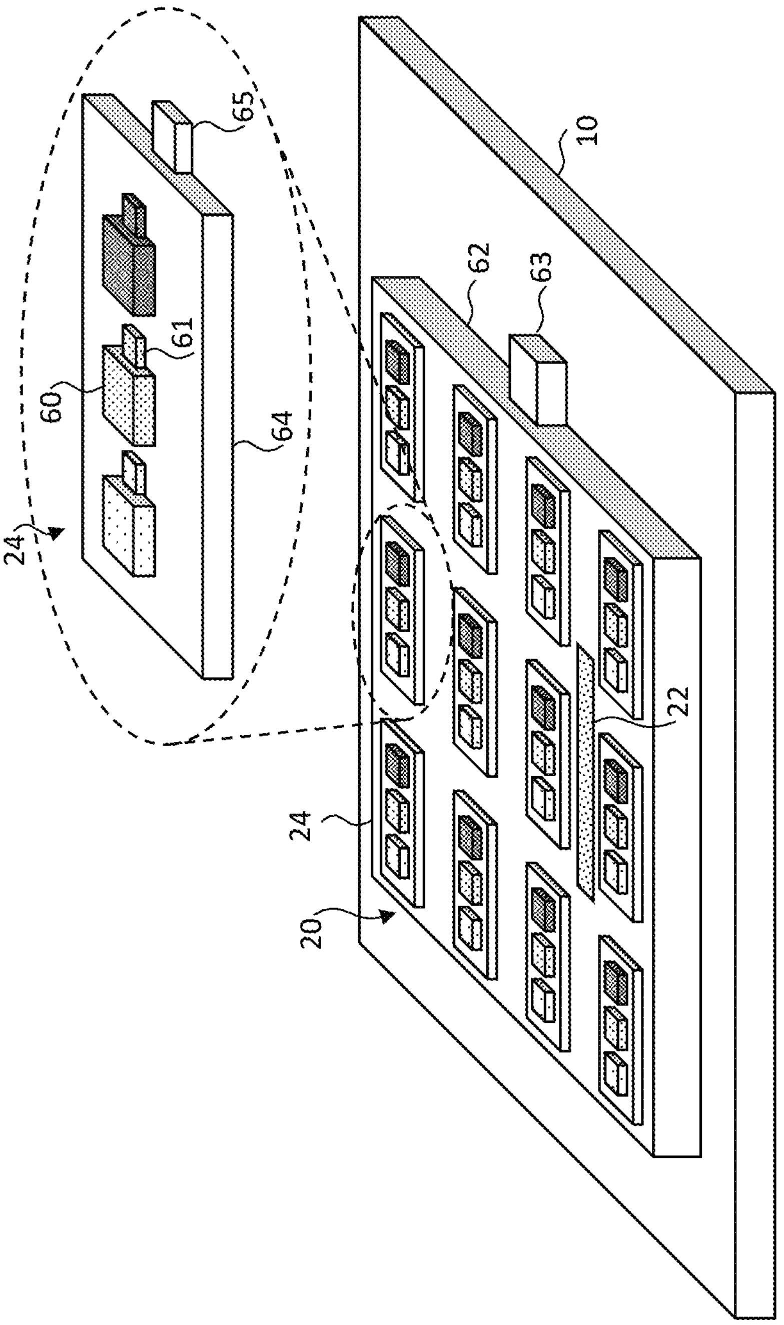
FIG. 9 is a perspective of a pixel cluster and display with a cluster substrate and pixel substrates according to illustrative embodiments of the present disclosure.

As illustrated in FIG. 9, cluster controller 22 in each pixel cluster 20 can be formed in or on and native to cluster substrate 62 rather than micro-assembled on cluster substrate 62, for example where cluster substrate 62 is a semiconductor substrate such as a silicon substrate and by using photolithographic processes found in the integrated circuit industry. Cluster controller 22 can be an integrated circuit. Micro-LEDs 60 can be disposed directly on cluster substrate 62 (as in FIG. 8) or as illustrated in FIG. 9, pixels 24 with micro-LEDs 60 can be micro-assembled on a pixel substrate 64 and pixel substrate 64 can be micro-assembled on cluster substrate 62 so that pixel substrate 64 can comprise a broken (e.g., fractured) or separated pixel tether 65 as a consequence of micro-assembling pixel substrate 64 from a pixel source wafer to cluster substrate 62. Pixel substrates 64 can comprise material similar to or the same as cluster substrate 62 or display substrate 10. One or more pixels 24 with pixel substrates 64 can be disposed directly on or over cluster controller 22, so that cluster controller 22 can occupy a substantial amount of space on cluster substrate 62 or cluster controller 22 can be disposed between pixels 24 (as shown in FIG. 9). Cluster substrate 62 can be assembled on display substrate 10 or layers on display substrate 10.

Figure 10:
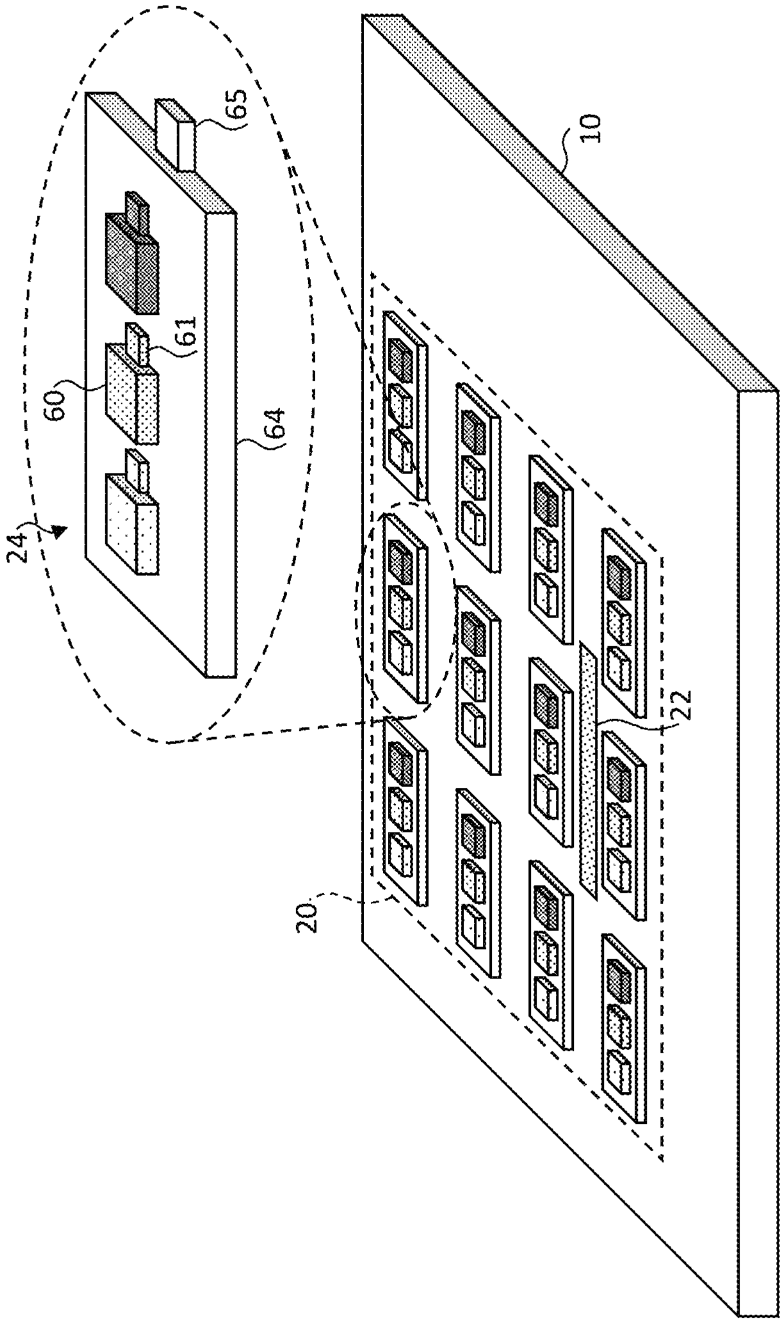
FIG. 10 is a perspective of a pixel cluster and display with pixel substrates according to illustrative embodiments of the present disclosure.

According to some embodiments and as shown in FIG. 10, cluster controller 22 can be formed in or on and native to display substrate 10, for example where display substrate 10 is a semiconductor substrate and, e.g., with photolithographic processing and materials, for example a silicon substrate in a micro-display. Micro-LEDs 60 in pixels 24 can be assembled, for example by micro-transfer printing, directly on display substrate 10 or layers on display substrate 10, as shown in FIG. 7, or can be disposed on pixel substrates 64 and pixel substrates 64 can be assembled, for example by micro-transfer printing, onto display substrate 10 or layers disposed on display substrate 10, as shown in FIG. 10.

Embodiments of the present disclosure illustrated in FIGS. 7-10 use cluster substrates 62 or pixel substrates 64, or both, to provide a compound micro-assembled structure. Such structures can be tested before assembly on display substrate 10. For example, pixel clusters 20 on cluster substrates 62 as shown in FIGS. 8 and 9 can be tested before assembly on display substrate 10. Similarly, pixels 24 disposed on pixel substrates 64 can be tested before micro-assembly on cluster substrates 62 or display substrate 10. By testing pixel clusters 20 or pixels 24 before assembly, any defective cluster controllers 22 or pixels 24 can be discarded and not assembled on display substrate 10 or cluster substrate 62, thereby improving display 90 yields and reducing costs. For example, either or both cluster substrate 62 or pixel substrate 64 can comprise probe pads for automated testing and micro-assembly systems can be programmed to discard or not assemble any defective pixel clusters 20 or defective pixels 24.

Display substrate 10 can be any useful substrate on which cluster controllers 22 and a pixel array of pixels 24 can be suitably disposed, for example glass, plastic, resin, fiberglass, semiconductor, ceramic, quartz, sapphire, or other substrates found in the display or integrated circuit industries. Display substrate 10 can be flexible or rigid and can be substantially flat and can have substantially parallel opposite sides, e.g., with manufacturing tolerances. Display row wires 17 and display column wires 19 can be wires (e.g., photolithographically defined electrical conductors such as metal lines) disposed on display substrate 10 that conduct electrical current from display row controllers 16 and display column controllers 18, respectively, to cluster controllers 22. Similarly, cluster row wires 26 and cluster column wires 28 can be wires (e.g., photolithographically defined electrical conductors such as metal lines) disposed on display substrate 10 that conduct electrical current from cluster controllers 22 to pixels 24 and micro-LEDs 60.

Generally, display substrate 10 has two opposing smooth sides suitable for material deposition, photolithographic processing, or micro-transfer printing of micro-LEDs 60 or cluster controllers 22. Display substrate 10 can have a size of a conventional display, for example a rectangle with a diagonal of a few centimeters to one or more meters. Display substrate 10 can include polymer, plastic, resin, polyimide, PEN, PET, metal, metal foil, glass, a semiconductor, or sapphire and have a transparency greater than or equal to 50%, 80%, 90%, or 95% for visible light. In some embodiments of the present disclosure, micro-LEDs 60 emit light through display substrate 10. In some embodiments, micro-LEDs 60 emit light in a direction opposite display substrate 10. Display substrate 10 can have a thickness from 5 microns to 20 mm (e.g., 5 to 10 microns, 10 to 50 microns, 50 to 100 microns, 100 to 200 microns, 200 to 500 microns, 500 microns to 0.5 mm, 0.5 to 1 mm, 1 mm to 5 mm, 5 mm to 10 mm, or 10 mm to 20 mm). According to some embodiments of the present disclosure, display substrate 10 can include layers formed on an underlying structure or substrate, for example a rigid or flexible glass or plastic substrate.

Cluster controller 22 can be, for example, a bare, unpackaged integrated circuit disposed between rows and columns of pixels 24 micro-transfer printing or formed in cluster substrate 62 or display substrate 10 that provides control, timing (e.g., clocks) or data signals (e.g., column-data signals) through cluster row wires 26 and cluster control wires 28 to pixels 24 to enable pixels 24 to emit light in display 90. Cluster controller 22 can comprise a single integrated circuit or can comprise multiple integrated circuits, e.g., electrically connected integrated circuits. The integrated circuit(s) can be micro-transfer printed as unpackaged dies and can comprise broken (e.g., fractured) or separated controller tether(s) 23.

When active, pixels 24 can be controlled at a constant current with timing signals 42 such as temporal pulse-width modulation signals provided by cluster controller 22. Pixels 24 can comprise a red-micro-light-emitting diode 60 that emits red light, a green-micro-light-emitting diode 60 that emits green light, and a blue-micro-light-emitting diode 60 that emits blue light (collectively micro-light-emitting diodes 60 or micro-LEDs 60) under the control of cluster controller 22. In certain embodiments, micro-light emitters 60 that emit light of other color(s) are included in pixel 24, such as a yellow micro-light-emitting diode 60. Light-emitting diodes 60 can be mini-LEDs 60 (e.g., having a largest dimension no greater than 500 microns) or micro-LEDs 60 (e.g., having a largest dimension of no greater than 100 microns). Pixels 24 can emit one color of light or white light (e.g., as in a black-and-white display) or multiple colors of light (e.g., red, green, and blue light as in a color display).

The pixel array of pixels 24 can be a completely regular array (e.g., as shown in FIGS. 1 and 2) or can have pixel rows or pixel columns of pixels 24 that are offset from each other, so that pixel rows or pixel columns of pixels 24 are not disposed in a straight line and can, for example, form a zigzag line (not shown in the Figures) or, as another example, have non-uniform spacing(s). Cluster controllers 22 can be disposed between rows or columns of pixels 24 even when pixels 24 are arranged in a regular array, at least in part because cluster controllers 22 can be micro-integrated-circuits comprising bare, unpackaged die disposed between rows or columns of pixels 24 by micro-transfer printing.

Pixels 24 can be passive-matrix pixels 24, can be analog or digital, and can comprise one or more light-controlling or light-responsive elements, e.g., inorganic micro-light-emitting diodes 60. Pixels 24 can comprise micro-light-emitting diodes 60. Inorganic micro-light-emitting diodes 60 can have a small area, for example having a length and a width each no greater than 20 microns, no greater than 50 microns, no greater than 100 microns, or no greater than 200 microns. Such small, light emitters 60 have a relatively small fill factor (aperture ratio) and can leave significant area on display substrate 10 for more or larger wires or additional functional elements such as cluster controllers 22. Such relatively small, light emitters 60 disposed on a relatively large display substrate 10 (for example a laptop display, a monitor display, or a television display) take up relatively little area on display substrate 10 so that the fill factor of micro-LEDs 60 on display substrate 10 (e.g., the aperture ratio or the ratio of the sum of the areas of micro-LEDs 60 over display substrate 10 to the convex hull area of display substrate 10 that includes micro-LEDs 60 or minimum rectangular area of the pixel array of pixels 24 such as display area 12) is no greater than 30% (e.g., no greater than 20%, no greater than 10%, no greater than 5%, no greater than 1%, no greater than 0.5%, no greater than 0.1%, no greater than 0.05%, or no greater than 0.01%). For example, an 8K display 90 (having a display area 12 bounding 8192 by 4096 display pixels 24) over a 2-meter diagonal 9:16 display 90 with micro-LEDs 60 having a 15-micron length and 8-micron width has a fill factor of much less than 1%. An 8K display 90 having 40-micron by 40-micron pixels 24 can have a fill factor of about 3%. According to some embodiments of the present disclosure, the remaining area not occupied by light emitters 60 is used at least partly to provide cluster controllers 22 between light emitters 60.

In contrast to embodiments of the present disclosure, existing prior-art flat-panel displays have a desirably large fill factor. For example, the lifetime of OLED displays is increased with a larger fill factor because such a larger fill factor reduces current density and improves organic material lifetimes. Similarly, liquid-crystal displays (LCDs) have a desirably large fill factor to reduce the necessary brightness of the backlight (because larger pixels 24 can transmit more light), improving the backlight lifetime and display power efficiency. Thus, prior-art displays cannot provide integrated cluster control because there is no space on their display substrates 10 for additional or larger functional elements, such as cluster controllers 22, in contrast to embodiments of the present disclosure.

In some embodiments, integrated circuits such as micro-LEDs 60 or cluster controllers 22 are made in or on a native semiconductor wafer and have a semiconductor substrate and are micro-transfer printed to a non-native substrate, such as pixel substrate 64, cluster substrate 62, or display substrate 10. Any of pixel substrate 64, cluster substrate 62, and display substrate 10 can include glass, resin, polymer, plastic, ceramic, or metal and can be non-elastomeric. Cluster substrate 62 can be a semiconductor substrate and cluster controller 22 can be formed in or on and native to cluster substrate 62. Semiconductor materials (for example doped or undoped silicon, GaAs, or GaN) and processes for making small integrated circuits are well known in the integrated circuit arts. Likewise, backplanes such as display substrates 10 and means for interconnecting integrated circuit elements on the backplane are well known in the display and printed circuit board arts.

In a method according to some embodiments of the present disclosure, integrated circuits are disposed on the display substrate 10 by micro-transfer printing. In some methods, integrated circuits (or portions thereof) or micro-LEDs 60 are disposed on pixel substrate 64 to form a heterogeneous pixel 24 and pixel 24 is disposed on cluster substrate 62 or display substrate 10 using compound micro-assembly structures and methods, for example as described in U.S. patent application Ser. No. 14/822,868 filed Aug. 10, 2015, entitled Compound Micro-Assembly Strategies and Devices. However, since pixels 24 or pixel clusters 20 can be larger than the integrated circuits included therein, in some methods of the present disclosure, pixels 24 or pixel clusters 20 are disposed on display substrate 10 using pick-and-place methods found in the printed-circuit board industry, for example using vacuum grippers. Pixels 24 or pixel clusters 20 can be interconnected on display substrate 10 using photolithographic methods and materials or printed circuit board methods and materials.

In certain embodiments, display substrate 10 includes material, for example glass or plastic, different from a material in an integrated-circuit substrate, for example a semiconductor material such as silicon or GaN. Micro-LEDs 60 can be formed separately on separate semiconductor substrates, assembled onto cluster substrates 62 or pixel substrates 64 to form pixels 24 and then the assembled units are located on the surface of cluster substrate 62 or display substrate 10. This arrangement has the advantage that the integrated circuits, pixel clusters 20, or pixels 24 can be separately tested on cluster substrate 62 or pixel substrate 64 and pixel cluster 20 or pixel 24 modules accepted, repaired, or discarded before pixel clusters 20 or pixels 24 are located on display substrate 10, thus improving yields and reducing costs.

In some embodiments of the present disclosure, providing display 90, display substrate 10, pixel clusters 20, or pixels 24 can include forming conductive wires (e.g., display row wire 17, display column wire 19, cluster row wire 26, and cluster column wire 28) on display substrate 10, cluster substrate 62, or pixel substrate 64 by using photolithographic and display substrate 10 processing techniques, for example photolithographic processes employing metal or metal oxide deposition using evaporation or sputtering, curable resin coatings (e.g. SU8), positive or negative photoresist coating, radiation (e.g. ultraviolet radiation) exposure through a patterned mask, and etching methods to form patterned metal structures, vias, insulating layers, and electrical interconnections. Inkjet and screen-printing deposition processes and materials can be used to form patterned conductors or other electrical elements. The electrical interconnections, or wires, can be fine interconnections, for example having a width of less than fifty microns, less than twenty microns, less than ten microns, less than five microns, less than two microns, or less than one micron. Such fine interconnections are useful for interconnecting micro-integrated circuits, for example as bare dies with contact pads and used with cluster substrate 62 and pixel substrate 64. Alternatively, wires can include one or more crude lithography interconnections having a width from 2 μm to 2 mm, wherein each crude lithography interconnection electrically interconnects circuits, device, or modules on display substrate 10. For example, electrical interconnections cluster row wire 26, and cluster column wire 28 can be formed with fine interconnections (e.g., relatively small high-resolution interconnections) while display row wire 17 and display column wire 19 are formed with crude interconnections (e.g., relatively large low-resolution interconnections).

In some embodiments, red, green, and blue LEDs (e.g., micro-LEDs 60) are micro transfer printed to pixel substrates 64, cluster substrate 62, or display substrate 10 in one or more transfers and can comprise broken (e.g., fractured) or separated LED tethers 61 as a consequence of micro-transfer printing. For a discussion of micro-transfer printing techniques that can be used or adapted for use in methods disclosed herein, see U.S. Pat. Nos. 8,722,458, 7,622,367 and 8,506,867, each of which is hereby incorporated by reference in its entirety. The transferred light emitters 60 are then interconnected, for example with conductive wires and optionally including connection pads and other electrical connection structures.

In some embodiments of the present disclosure, a pixel array of display pixels 24 (e.g., as in FIG. 1) can include at least 40,000, 62,500, 100,000, 500,000, one million, two million, three million, six million, eight million, or thirty-two million display pixels 24, for example for a quarter VGA, VGA, HD, 4K, or 8K display 90 having various pixel densities (e.g., having at least 50, at least 75, at least 100, at least 150, at least 200, at least 300, or at least 400 pixels per inch (ppi)). In some embodiments of the present disclosure, light emitters 60 in pixels 24 can be considered integrated circuits, since they are formed in a substrate, for example a wafer substrate, or layer using integrated-circuit processes. The substrate or layer need not necessarily be silicon, for example III-V semiconductor wafers or layers can be used to form light emitters 60 using integrated-circuit processes and are considered integrated circuits (or portions thereof) in the context of this disclosure.

In some embodiments of the present disclosure, light emitters 60 are inorganic micro-light-emitting diodes 60 (micro-LEDs 60), for example having light-emissive areas of less than 10, 20, 50, or 100 square microns. In some embodiments, light emitters 60 have physical dimensions that are less than 100 μm, for example having at least one of a width from 2 to 50 μm (e.g., 2 to 5 μm, 5 to 10 μm, 10 to 20 μm, or 20 to 50 μm), a length from 2 to 50 μm (e.g., 2 to 5 μm, 5 to 10 μm, 10 to 20 μm, or 20 to 50 μm), and a height from 2 to 50 μm (e.g., 2 to 5 μm, 5 to 10 μm, 10 to 20 μm, or 20 to 50 μm). Light emitters 60 can have a size of, for example, one square micron to 500 square microns. Such micro-LEDs 60 have the advantage of a small light-emissive area compared to their brightness as well as color purity providing highly saturated display colors and a substantially Lambertian emission providing a wide viewing angle. Such small light emitters 60 also provide additional space on display substrate 10 for additional functional elements or larger wires.

In some embodiments, micro-LEDs 60 are formed in substrates or on supports separate from display substrate 10. For example, micro-LEDs 60 can be made in a native compound semiconductor wafer. Similarly, cluster controllers 22 can be separately formed in a semiconductor wafer such as a silicon wafer e.g., in CMOS. Micro-LEDs 60, or cluster controllers 22 are then removed from their respective source wafers and transferred, for example using micro-transfer printing, to display substrate 10, cluster substrate 62, or pixel substrate 64. Such arrangements have the advantage of using a crystalline semiconductor substrate that provides higher-performance integrated circuit components than can be made in the amorphous or polysilicon semiconductor available in thin-film circuits on a large substrate such as display substrate 10. Such micro-transferred micro-LEDs 60 or cluster controllers 22 can comprise a broken (e.g., fractured) or separated LED tether 61 or controller tether 23 as a consequence of a micro-transfer printing process.

According to various embodiments, display 90 can include a variety of designs having a variety of resolutions, light emitter 60 sizes, and display substrate 10 areas.

By employing a multi-step transfer or assembly process, increased yields are achieved and thus reduced costs for displays 90 of the present disclosure. Additional details useful in understanding and performing aspects of the present disclosure are described in U.S. patent application Ser. No. 14/743,981, filed Jun. 18, 2015, entitled Micro Assembled Micro LED Displays and Lighting Elements, the disclosure of which is hereby incorporated by reference herein in its entirety.

As is understood by those skilled in the art, the terms "over", "under", "above", "below", "beneath", and "on" are relative terms and can be interchanged in reference to different orientations of the layers, elements, and substrates included in the present disclosure. For example, a first layer on a second layer, in some embodiments means a first layer directly on and in contact with a second layer. In other embodiments, a first layer on a second layer can include another layer there between.

As is also understood by those skilled in the art, the terms "column" and "row", "horizontal" and "vertical", and "x" and "y", "top" and "bottom", and "left" and "right" are arbitrary designations that can be interchanged (unless otherwise clear from context).

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously. The disclosure has been described in detail with particular express reference to certain embodiments thereof, but it will be understood that variations and modifications can be effected within the spirit and scope of the following claims.

PARTS LIST

10 display substrate
12 display area
14 display controller
15 display system controller
16 display row controller
17 display row wires
18 display column controller
19 display column wire

20 pixel cluster/cluster
22 cluster controller
23 controller tether
24 pixel
25B corresponding pixel rows
25T corresponding pixel rows
26 cluster row wire/row wire
27 row-control circuit
28 cluster column wire
29 row driver
30 cluster current source/cluster current sink
35 enable circuit control signal
35A enable circuit control signal
35B enable circuit control signal
35C enable circuit control signal
36 cluster current source transistor
38 current reference
42 timing signal
50 switch
52 transistor
52A transistor
52B transistor
52C transistor
52D transistor
60 light-emitting diode/micro-LED/light emitter/light controller/LED
61 LED tether/light-controller tether
62 cluster substrate
63 cluster tether
64 pixel substrate
65 pixel tether
90 display
100 provide display step
105 receive image step
110 send pixel data to pixel controllers step
115 activate cluster row zero and provide pixel data for row zero step
120 activate cluster row one and provide pixel data for row one step
125 activate cluster row (N−1) and provide pixel data for row (N−1) step

What is claimed:

1. A display, comprising:

pixels distributed in a pixel array having rows and columns, wherein the pixels are grouped in a two-dimensional pixel cluster array having rows and columns of mutually exclusive pixel clusters each comprising ones of the pixels;

cluster controllers, each of the cluster controllers connected to the ones of the pixels in one of the pixel clusters to control the ones of the pixels to emit light, wherein the cluster controllers are disposed in columns each having two or more rows of the cluster controllers;

a display controller connected to each row of the pixels; and a display column controller connected to each of the columns of the cluster controllers with a separate display column wire such that, for each of the columns of the cluster controllers, the display column controller is operable to control each of the cluster controllers in the column via the separate display column wire.

2. The display of claim 1, wherein for each of the rows of the pixels, all of the pixels in the row are connected with a row wire and:

(i) the row wire for each of the rows of the pixels is separately connected to the display controller, or (ii) for corresponding rows of the pixels in different rows of the pixel clusters, the row wires for the corresponding rows are connected together and to the display controller.

3. The display of claim 1, wherein, for each of the pixel clusters, for each column of the pixels in the pixel cluster, the pixels in the column are connected to the cluster controller for the pixel cluster with a corresponding cluster column wire.

4. The display of claim 1, wherein the display controller comprises the display column controller.

5. The display of claim 1, wherein the display controller comprises a display row controller and, for each row of the pixels, the display row controller is connected to the pixels in the row with a corresponding row wire.

6. The display of claim 1, wherein the cluster controllers are distributed in a cluster array of rows and columns and wherein the display controller comprises a display row controller separately connected to each row of the cluster controllers in the cluster array.

7. The display of claim 1, wherein each of the cluster controllers is operable to store pixel data for the ones of the pixels in the one of the pixel clusters to which the cluster controller is connected.

8. The display of claim 7, wherein each of the cluster controllers is operable to successively provide the pixel data to rows of the pixels in the pixel cluster and the display controller is operable to successively activate the rows of the pixels in the pixel cluster.

9. The display of claim 1, wherein the cluster controllers and the display controller are operable to simultaneously provide passive-matrix control to all of the pixel clusters so that at least one row of the pixels in each of the pixel clusters simultaneously control light.

10. The display of claim 1, wherein the display controller comprises row-control circuits and, for each of the rows of the pixels, all of the pixels in the row are connected with a row wire and:

(i) the row wire for each of the rows of the pixels is separately connected to the display controller such that, for each of the rows of the pixels, all of the pixels in the row are separately responsive to one of the row-control circuits, or (ii) the pixel clusters are arranged in rows and one or more columns and, for corresponding rows of the pixels in different rows of the pixel clusters, the row wires for the corresponding rows are connected together and to the display controller such that all of the pixels in the corresponding rows are together responsive to a common one of the row-control circuits.

11. The display of claim 1, wherein the pixels comprise one or more light-emitting diodes and each of the cluster controllers is operable to control the one or more light-emitting diodes in the ones of the pixels in the one of the pixel clusters to which the cluster control is connected to emit light.

12. A display, comprising:

pixels distributed in a pixel array having rows and columns, wherein the pixels are grouped in mutually exclusive pixel clusters each comprising ones of the pixels;

cluster controllers, each of the cluster controllers connected to the ones of the pixels in one of the pixel clusters to control the ones of the pixels to emit light;

a display controller connected to each row of the pixels; and a display column controller, wherein the cluster controllers are distributed in a cluster array having rows and columns and the display column controller is connected to the cluster controller in each column of the cluster controllers in the cluster array, wherein the cluster controllers are connected in one or more groups, each of the one or more groups separately connected to the display column controller and (a) the cluster controllers are operable using token passing or (b) the cluster controllers are operable using pixel data comprising cluster addresses.

13. A display, comprising:

pixels distributed in a pixel array having rows and columns, wherein the pixels are grouped in mutually exclusive pixel clusters each comprising ones of the pixels;

cluster controllers, each of the cluster controllers connected to the ones of the pixels in one of the pixel clusters to control the ones of the pixels to emit light; and a display controller connected to each row of the pixels, wherein the cluster controllers are distributed in a cluster array of rows and columns, wherein the display controller comprises a display row controller separately connected to each row of the cluster controllers in the cluster array, and wherein, for each of the rows of the cluster controllers, each of the cluster controllers in the row is connected together.

14. A display, comprising:

pixels distributed in a pixel array having rows and columns, wherein the pixels are grouped in mutually exclusive pixel clusters each comprising ones of the pixels;

cluster controllers, each of the cluster controllers connected to the ones of the pixels in one of the pixel clusters to control the ones of the pixels to emit light;

a display controller connected to each row of the pixels; and a display substrate having a display area, wherein the pixels are disposed in the display area on the display substrate and at least some of the cluster controllers are disposed between ones of the pixels in the display area.

15. A display, comprising:

pixels distributed in a pixel array having rows and columns, wherein the pixels are grouped in mutually exclusive pixel clusters each comprising ones of the pixels;

cluster controllers, each of the cluster controllers connected to the ones of the pixels in one of the pixel clusters to control the ones of the pixels to emit light; and a display controller connected to each row of the pixels, wherein, for at least one of the cluster controllers, the cluster controller is disposed between the ones of the pixels in one of the pixel clusters.

16. The display of claim 15, wherein the cluster controller is disposed between rows of the ones of the pixels in the one of the pixel clusters.

17. A display, comprising:

pixels distributed in a pixel array having rows and columns, wherein the pixels are grouped in mutually exclusive pixel clusters each comprising ones of the pixels;

cluster controllers, each of the cluster controllers connected to the ones of the pixels in one of the pixel clusters to control the ones of the pixels to emit light; and a display controller connected to each row of the pixels, wherein at least one of the cluster controllers is disposed between pixels in adjacent ones of the pixel clusters.

18. The display of claim 17, wherein, for at least one of the cluster controllers, the cluster controller is disposed between rows of pixels in adjacent pixel clusters on or over the display substrate.

* * * * *